(12) United States Patent
Itano et al.

(10) Patent No.: US 11,286,409 B2
(45) Date of Patent: *Mar. 29, 2022

(54) COMPOSITION CONTAINING REFRIGERANT INCLUDING R32, R125, R143A AND R134A, AND REFRIGERATION METHOD USING SAID COMPOSITION, METHOD FOR OPERATING REFRIGERATOR, AND REFRIGERATOR

(71) Applicant: DAIKIN INDUSTRIES, LTD., Osaka (JP)

(72) Inventors: Mitsushi Itano, Osaka (JP); Hitomi Kuroki, Osaka (JP); Shun Ohkubo, Osaka (JP); Tatsumi Tsuchiya, Osaka (JP); Kenji Gobou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/769,058

(22) PCT Filed: Dec. 7, 2018

(86) PCT No.: PCT/JP2018/045182
§ 371 (c)(1),
(2) Date: Jun. 2, 2020

(87) PCT Pub. No.: WO2019/112060
PCT Pub. Date: Jun. 13, 2019

(65) Prior Publication Data
US 2021/0230467 A1    Jul. 29, 2021

(30) Foreign Application Priority Data
Dec. 7, 2017  (JP) .............................. JP2017-235137

(51) Int. Cl.
| | | |
|---|---|---|
| C09K 5/04 | (2006.01) | |
| C10M 171/00 | (2006.01) | |
| F25B 9/00 | (2006.01) | |
| C10N 20/00 | (2006.01) | |
| C10N 40/30 | (2006.01) | |

(52) U.S. Cl.
CPC ......... *C09K 5/045* (2013.01); *C10M 171/008* (2013.01); *F25B 9/006* (2013.01); *C09K 2205/128* (2013.01); *C09K 2205/22* (2013.01); *C09K 2205/40* (2013.01); *C10N 2020/101* (2020.05); *C10N 2040/30* (2013.01)

(58) Field of Classification Search
CPC .............. C09K 5/045; C09K 2205/40; C09K 2205/128; C09K 2205/22; C10M 171/008; F25B 9/006; C10N 2040/30; C10N 2020/101
USPC ................ 252/67, 68; 62/467, 529
See application file for complete search history.

(56) References Cited

U.S. PATENT DOCUMENTS

| | | | | |
|---|---|---|---|---|
| 5,066,410 A | * | 11/1991 | Omure | C09K 5/045 252/68 |
| 6,018,952 A | * | 2/2000 | Ide | C09K 5/045 62/114 |
| 6,183,660 B1 | | 2/2001 | Omure et al. | |
| 6,187,219 B1 | | 2/2001 | Omure et al. | |
| 2007/0187638 A1 | | 8/2007 | Guilpain et al. | |
| 2011/0006248 A1 | * | 1/2011 | Van Horn | C09K 5/045 252/68 |
| 2012/0291433 A1 | * | 11/2012 | Meng | F01K 25/08 60/641.15 |
| 2013/0096218 A1 | * | 4/2013 | Rached | C09K 5/00 521/170 |
| 2014/0245760 A1 | * | 9/2014 | Leek | C09K 5/045 62/84 |
| 2015/0205409 A1 | | 7/2015 | Shingai et al. | |
| 2017/0174967 A1 | * | 6/2017 | Itano | C10M 107/24 |
| 2017/0369754 A1 | | 12/2017 | Nishida | |
| 2018/0298259 A1 | * | 10/2018 | Itano | F25D 21/06 |
| 2018/0371303 A1 | * | 12/2018 | Itano | C09K 5/045 |
| 2019/0211246 A1 | * | 7/2019 | Tsuchiya | C09K 5/045 |
| 2020/0109326 A1 | * | 4/2020 | Itano | C10M 107/24 |
| 2020/0308463 A1 | * | 10/2020 | Itano | C09K 5/044 |
| 2021/0108120 A1 | * | 4/2021 | Itano | C09K 5/045 |

FOREIGN PATENT DOCUMENTS

| | | |
|---|---|---|
| CN | 103865491 | 6/2014 |
| JP | 47-25559 | 7/1972 |
| JP | 63-20773 | 4/1988 |
| JP | 3-287688 | 12/1991 |
| JP | 2004-67495 | 3/2004 |
| JP | 2007-505963 | 3/2007 |
| JP | 2015-135606 | 7/2015 |

(Continued)

OTHER PUBLICATIONS

CAS reg. No. 173268-57-0, Feb. 15, 1996. (Year: 1996).*
Extended European Search Report dated Aug. 25, 2021 in corresponding European Patent Application No. 18885735.3.
International Search Report dated Jul. 30, 2019 in International (PCT) Application No. PCT/JP2019/016710.
International Search Report dated Mar. 12, 2019 in International (PCT) Application No. PCT/JP2018/045182.
Extended European Search Report dated Dec. 22, 2021, in European Patent Application No. 19789478.5.

*Primary Examiner* — Douglas J McGinty
(74) *Attorney, Agent, or Firm* — Wenderoth, Lind & Ponack, L.L.P.

(57) ABSTRACT

Provided is a composition containing a refrigerant that has a refrigerating capacity equivalent to that of widely used R404A, and a low GWP. The composition contains a refrigerant that contains difluoromethane (R32), pentafluoroethane (R125), 1,1,1-trifluoroethane (R143a), and 1,1,1,2-tetrafluoroethane (R134a) in specific concentrations.

11 Claims, 8 Drawing Sheets

(56) References Cited

FOREIGN PATENT DOCUMENTS

| WO | 92/01762 | 2/1992 |
|---|---|---|
| WO | 2016/114217 | 7/2016 |
| WO | 2017/062642 | 4/2017 |
| WO | 2017/086328 | 5/2017 |

\* cited by examiner

COMPOSITION CONTAINING REFRIGERANT INCLUDING R32, R125, R143A AND R134A, AND REFRIGERATION METHOD USING SAID COMPOSITION, METHOD FOR OPERATING REFRIGERATOR, AND REFRIGERATOR

TECHNICAL FIELD

The present disclosure relates to a composition that contains a refrigerant containing R32, R125, R143a, and R134a (the composition also includes a composition that consists of the four components contained in the refrigerant, i.e., difluoromethane (R32), pentafluoroethane (R125), 1,1,1-trifluoroethane (R143a), and 1,1,1,2-tetrafluoroethane (R134a)); a refrigeration method using the composition; a method for operating a refrigerating machine using the composition; and a refrigerating machine using the composition.

BACKGROUND ART

A mixture of fluorinated hydrocarbons free of chlorine in their molecular structure, such as difluoromethane ($CH_2F_2$, R32, boiling point: −52° C.), pentafluoroethane ($CF_3CHF_2$, R125, boiling point: −48° C.), 1,1,1-trifluoroethane ($CF_3CH_3$, R143a, boiling point: −47° C.), 1,1,1,2-tetrafluoroethane ($CF_3CH_2F$, R134a, boiling point: −26° C.), 1 1-difluoroethane ($CHF_2CH_3$, R152a, boiling point: −24° C.), and 2,3,3,3-tetrafluoropropene ($CF_3CF=CH_2$, 1234yf, boiling point: −29° C.), has been used in refrigerants for air conditioners, refrigerating machines, refrigerators, and other similar equipment.

Of these fluorinated hydrocarbons, there have been suggested, for example, a three-component mixed refrigerant consisting of R32, R125, and R134a in respective amounts of 23, 25, and 52 mass % (R407C); and a three-component mixed refrigerant consisting of R125, 143a, and R134a in respective amounts of 44, 52, and 4 mass % (R404A). Currently, R404A is widely used as a refrigerant for freezing and refrigeration (e.g., PTL 1 and 2).

However, R404A has a very high global warming potential (GWP) at 3922; this is about twice as large as the GWP of $CHClF_2$ (R22), one of the chlorine-containing fluorinated hydrocarbons. Thus, as an alternative refrigerant for R404A, there is demand for the development of a refrigerant that has a refrigerating capacity equivalent to that of R404A, and a low GWP.

CITATION LIST

Patent Literature

PTL 1: WO92/01762
PTL 2: JPH03-287688

SUMMARY OF INVENTION

Technical Problem

PTL 1 and 2 report mixed refrigerants containing pentafluoroethane (R125), 1,1,1-trifluoroethane (R143a), and 1,1,1,2-tetrafluoroethane (R134a) in various formulations. However, refrigerants that have a refrigerating capacity equivalent to that of R404A and a low GWP (including mixed refrigerants) have yet to be developed, at present.

An object of the present disclosure is to provide a refrigerant-containing composition by using a refrigerant that has a refrigerating capacity equivalent to that of widely used R404A, and a low GWP (2500 or less). Another object of the present disclosure is to provide a refrigeration method using the composition, a method for operating a refrigerating machine using the composition, and a refrigerating machine using the composition.

Solution to Problem

The present inventors conducted intensive research to achieve the objects; and found that a composition that contains a refrigerant containing difluoromethane (R32), pentafluoroethane (R125), 1,1,1-trifluoroethane (R143a), and 1,1,1,2-tetrafluoroethane (R134a) in specific concentrations can achieve the objects. The inventors then completed the present disclosure.

Specifically, the present disclosure relates to the following composition, refrigeration method, method for operating a refrigerating machine, and refrigerating machine.
1. A composition comprising a refrigerant that contains R32, R125, R143a, and R134a,
the composition comprising one member selected from the group consisting of refrigerant 1, refrigerant 2, refrigerant 3, and refrigerant 4,
wherein
the total concentration of R32, R125, R143a, and R134a is 100 mass %,
the concentration of R32 is x mass %, and
in a ternary composition diagram in which the total concentration of R125, R143a, and R134a is (100−x) mass %, refrigerant 1 has a compositional ratio as follows
(1) −1 17.4 mass %≥x≥13.1 mass %,
(1) −2 the concentration of R125, R143a, and 134a (the concentration of R125 (mass %)/the concentration of R143a (mass %)/the concentration of 134a (mass %)) falls on a point or within a triangular region that has the following points as vertices
point A (0.35x+51.892/0.0/100−R32−R143a−R125),
point D (−0.4309$x^2$+0.0043x+130.4/0.2968$x^2$+0.1331x−52.681/100−R32−R143a−R125), and
point C (−2.2307x+90.59/0.0/100−R32−R125−R143a);
refrigerant 2 has a compositional ratio as follows
(2) −1 22.5 mass %≥x>17.4 mass %,
(2) −2 the concentration of R125, R143a, and 134a (the concentration of R125 (mass %)/the concentration of R143a (mass %)/the concentration of 134a (mass %)) falls within a quadrangular region that has the following points as vertices
point A (0.3726x+51.526/0.0/100−R32−R125−R143a),
point B (0.0/0.2547x+35.057/100−R32−R125−R143a),
point D (0.0/−2.2158x+78.042/100−R32−R125−R143a), and
point C (−2.5097x+88.978/0.0/100−R32−R125−R143a);
refrigerant 3 has a compositional ratio as follows
(3) −1 27.5 mass %≥x>22.5 mass %,
(3) −2 the concentration of R125, R143a, and 134a (the concentration of R125 (mass %)/the concentration of R143a (mass %)/the concentration of 134a (mass %)) falls within a quadrangular region that has the following points as vertices
point A (0.36x+51.8/0.0/100−R32−R125−R143a),
point B (0.0/0.24x+35.4/100−R32−R125−R143a),
point D (0.0/−2.12x+75.867/100−R32−R125−R143a), and
point C (−2.42x+86.933/0.0/100−R32−R125−R143a); and
refrigerant 4 has a compositional ratio as follows
(4) −1 32.5 mass %≥x>27.5 mass %, (4) -2 the concentration of R125, R143a, and 134a (the concentration of R125 (mass %)/the concentration of R143a (mass %)/the concentration of 134a (mass %)) falls within a quadrangular region that has the following points as vertices
point A (0.36x+51.8/0.0/100−R32−R125−R143a),
point B (0.0/0.24x+35.4/100−R32−R125−R143a),
point D (0.0/−2.04x+73.7/100−R32−R125−R143a), and
point C (−2.36x+85.3/0.0/100−R32−R125−R143a).
2. A composition comprising a refrigerant that contains R32, R125, R143a, and R134a,
the composition comprising one member selected from the group consisting of refrigerant A, refrigerant B, and refrigerant C,
wherein
the total concentration of R32, R125, and (R143a+R134a) is 100 mass %,
the ratio of the concentration of R143a to the concentration of (R143a+R134a) is r=100×[R143a/(R143a+R134a)], and
in a ternary composition diagram in which the total concentration of R32, R125, and (R143a+R134a) is 100 mass %,
refrigerant A has a compositional ratio as follows
(1) −1 11≥r≥0,
(1) −2 the concentration of R32, R125, and (R143a+134a) (the concentration of R32 (mass %)/the concentration of R125 (mass %)/the concentration of (R143a+134a) (mass %)) falls within a triangular region that has the following points as vertices
point $I_{0 \leq r \leq 11}$ (32.5/−0.0636r+63.5/100−R32−R125),
point $G_{0 \leq r \leq 11}$ (0.0455r+13.1/−0.5091r+56.5/100−R32−R125), and
point $J_{0 \leq r \leq 11}$ (32.5/−0.8455r+9.3/100−R32−R125);
refrigerant B has a compositional ratio as follows
(2) −1 35.2≥r>11,
(2) −2 the concentration of R32, R125, and (R143a+134a) (the concentration of R32 (mass %)/the concentration of R125 (mass %)/the concentration of (R143a+134a) (mass %)) falls within a quadrangular region that has the following points as vertices
point $I_{11<r \leq 35.2}$ (32.5/−0.003r²−0.0072r+63.239/100−R32−R125),
point $G_{11<r \leq 35.2}$ (0.001r²+0.0287r+13.165/−0.0188r²−0.0718r+53.97/100−R32−R125),
point $H_{11<r \leq 35.2}$ (−0.0014r²−0.3292r+36.287/0.0/100−R32−R125), and
point $J_{11<r \leq 35.2}$ (32.5/0.0/67.5); and
Refrigerant C has a compositional ratio as follows
(3) −1 47.8≥r>35.2,
(3) −2 the concentration of R32, R125, and (R143a+134a) (the concentration of R32 (mass %)/the concentration of R125 (mass %)/the concentration of (R143a+134a) (mass %)) falls within a quadrangular region or triangular region that has the following points as vertices
point $I_{35.2<r \leq 47.8}$ (32.5/−0.0169r²+0.9999r+45.073/100−R32−R125),
point $G_{35.2<r \leq 47.8}$ (0.0041r²−0.1818r+16.716/−0.077r²+4.163r−23.0/100−R32−R125),
point $H_{35.2<r \leq 47.8}$ (−0.0011r²−0.3491r+36.712/0.0/100−R32−R125), and
point $J_{35.2<r \leq 47.8}$ (32.5/0.0/67.5).
3. The composition according to Item 1 or 2, wherein the refrigerant is used as an alternative refrigerant for R404A.
4. The composition according to any one of Items 1 to 3, wherein the total concentration of R32, R125, R143a, and R134a is 99.5 mass % or more based on the entire refrigerant.
5. The composition according to any one of Items 1 to 3, wherein the refrigerant consists of R32, R125, R143a, and R134a.
6. The composition according to any one of Items 1 to 5, comprising at least one member selected from the group consisting of water, tracers, ultraviolet fluorescent dyes, stabilizers, and polymerization inhibitors.
7. The composition according to any one of Items 1 to 6, comprising a refrigerant oil.
8. The composition according to Item 7, wherein the refrigerant oil contains at least one polymer selected from the group consisting of polyalkylene glycols (PAG), polyol esters (POE), and polyvinyl ethers (PVE).
9. A refrigeration method comprising operating a refrigeration cycle using the composition of any one of Items 1 to 8.
10. A method for operating a refrigerating machine that operates a refrigeration cycle using the composition of any one of Items 1 to 8.
11. A refrigerating machine using the composition of any one of Items 1 to 8.
12. The refrigerating machine according to Item 11, which is at least one member selected from the group consisting of refrigerators, freezers, water coolers, ice makers, refrigerating showcases, freezing showcases, freezing and refrigerating units, refrigerating machines for freezing and refrigerating warehouses, turbo refrigerating machines, and screw refrigerating machines.
13. A method for showing a mixture formulation composed of four refrigerant components with the total concentration of the four refrigerant components taken as 100 mass %, and the concentration of each component taken as a mass %, b mass %, c mass %, and d mass %, the method comprising
fixing the concentration of one refrigerant component at a mass %, and setting the concentration of the three remaining refrigerant components as b mass %, c mass %, and d mass %; and
showing the respective concentrations of the three refrigerant components in a ternary composition diagram (ternary diagram) in which the total concentration thereof is shown as (100−a) mass %.
14. A method for showing a mixture formulation composed of four refrigerant components with the total concentration of the four refrigerant components taken as 100 mass %, and the concentration of each component taken as a mass %, b mass %, c mass %, and d mass %, the method comprising
setting the respective concentrations of the four refrigerant components as a mass %, b mass %, and (c+d) mass % as three apparent components;
showing the respective concentrations of the three components in a ternary composition diagram (ternary diagram) in which the total concentration of the three components is shown as 100 mass %;
further introducing the mass ratio of c mass % to (c+d) mass %, which is r=100×[c/(c+d)]; and
showing the concentration of each of the three components in the ternary composition diagram for each value of r.

Advantageous Effects of Invention

The composition according to the present disclosure contains a refrigerant that contains difluoromethane (R32), pentafluoroethane (R125), 1,1,1-trifluoroethane (R143a), and 1,1,1,2-tetrafluoroethane (R134a) in specific concentrations. The refrigerant has the following performance: a refrigerating capacity equivalent to that of widely used R404A, and a low GWP (2500 or less). Such a composition according to the present disclosure is suitable as a working fluid for use in a refrigeration method including operating a refrigeration cycle.

DESCRIPTION OF EMBODIMENTS

Definition of Terms

Figure 1:
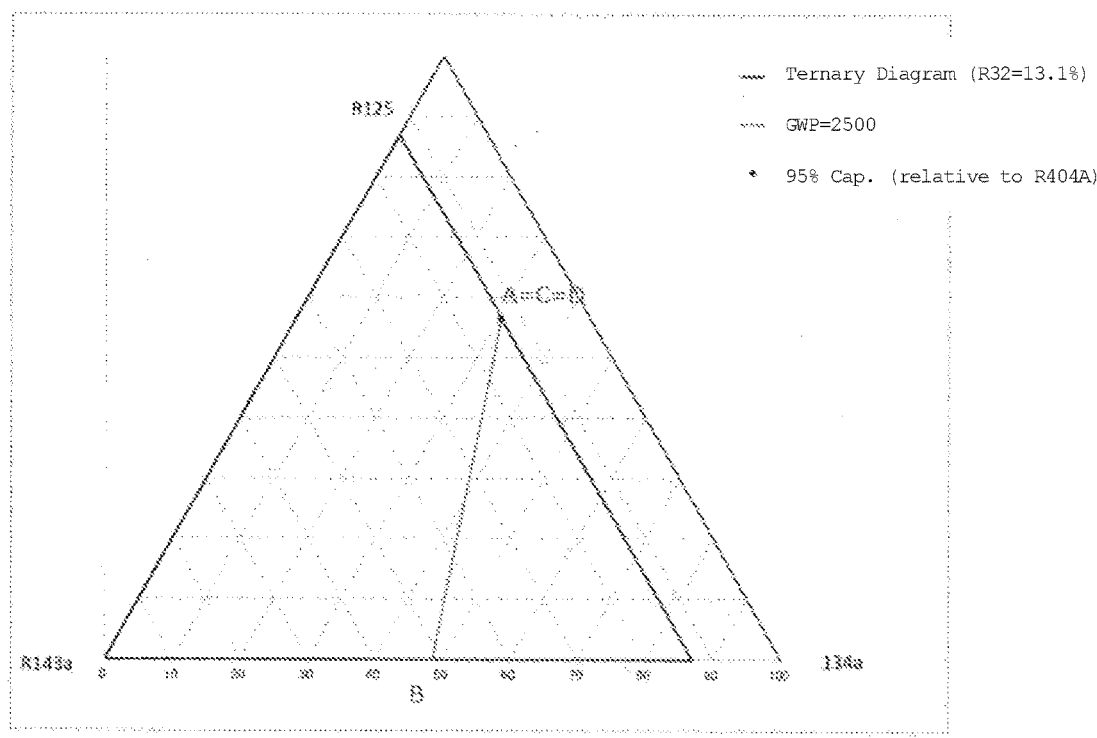
FIG. 1 is a diagram illustrating the compositional ratio of a refrigerant (a mixture of four components R32, R125, R143a, and R134a; the same applies to FIGS. 2 to 15) contained in the composition according to the present disclosure (the compositional ratio is illustrated as a point indicated by points A=D=C).

In this specification, the term "refrigerant" includes at least compounds that are specified in ISO817 (International Organization for Standardization), and that are provided a refrigerant number (ASHRAE number) representing the type of refrigerant with R at the beginning; and further includes refrigerants that have properties equivalent to those of such refrigerants, even though a refrigerant number is not provided. Refrigerants are broadly divided into "fluorocarbon-based compounds" and "non-fluorocarbon-based compounds," in terms of the structure of compounds. "Fluorocarbon-based compounds" include chlorofluorocarbons (CFC), hydrochlorofluorocarbons (HCFC), and hydrofluorocarbons (HFC). "Non-fluorocarbon-based compounds" include propane (R290), propylene (R1270), butane (R600), isobutane (R600a), carbon dioxide (R744), and ammonia (R717).

In the present specification, the phrase "a composition comprising a refrigerant" includes at least the following:
(1) a refrigerant itself (including a mixture of refrigerants, i.e., "a mixed refrigerant");
(2) a composition that further comprises other components, and that can be used in obtaining a working fluid for a refrigerating machine by mixing the composition with at least a refrigerant oil, and
(3) a working fluid for a refrigerating machine that contains a refrigerant oil.

In the present specification, of these three aspects, the composition in item (2) is referred to as a "refrigerant composition" in order to distinguish it from the refrigerant itself, which includes a mixed refrigerant. The working fluid for a refrigerating machine in item (3) is referred to as a "refrigerant oil-containing working fluid" in order to distinguish it from the "refrigerant composition."

In this specification, when the term "alternative" is used in the context in which the first refrigerant is replaced with the second refrigerant, the first type of "alternative" means that equipment designed for operation using the first refrigerant can be operated using the second refrigerant under optimum conditions, optionally with changes of only a few parts (at least one member of the refrigerant oil, gasket, packing, expansion valve, capillary tube, dryer, compressor, heat exchanger, control panel, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and/or adjustment necessary for replacing the first refrigerant with the second refrigerant is smaller.

The term "alternative" also includes the second type of "alternative" that means that equipment designed for operation using the second refrigerant is operated for the same use as the existing use with the first refrigerant, using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain the low temperature. In other words, refrigerating machines refer to conversion machines that gain energy from the outside to do work; and that perform energy conversion, in order to transfer heat from where the temperature is lower to where the temperature is higher.

1. Refrigerant 1.1 Refrigerant Component

The refrigerant for use in the present disclosure (below, "the refrigerant according to the present disclosure") is a mixed refrigerant containing difluoromethane (R32), pentafluoroethane (R125), 1,1,1-trifluoroethane (R143a), and 1,1,1,2-tetrafluoroethane (R134a) in specific concentrations (these refrigerants are described by their refrigerant number in most cases below), and has the following performance: a refrigerating capacity equivalent to that of widely used R404A, and a low GWP (2,500 or less).

For example, the refrigerant according to the present disclosure may have a refrigerating capacity of 95% or more relative to R404A. The refrigerant preferably has a refrigerating capacity of 100% or more, and more preferably 105% or more relative to R404A.

Due to its GWP of 2500 or less (preferably 2200 or less), the refrigerant according to the present disclosure can significantly reduce the impact on the environment as compared with other widely used refrigerants, from the global warming viewpoint.

The refrigerant according to the present disclosure preferably has a high ratio of the power consumed in refrigeration cycle to the refrigerating capacity (a coefficient of performance (COP)). Specifically, the refrigerant has a COP of preferably 95 or more, and more preferably 100 or more.

1.2 Compositional Ratio of Refrigerant (Mixed Refrigerant)

The compositional ratio of the mixed refrigerant (a mixed refrigerant of four components: R32, R125, R143a, and R134a), which is the basis for the effects provided by the refrigerant according to the present disclosure, cannot be directly described in a ternary composition diagram (ternary diagram) that illustrates the mixture formulation composed of three refrigerant components; this is because the mixed refrigerant has a mixture formulation composed of four refrigerant components. However, the following "Method 1 for Showing the Mixed Formulation Composed of Four Refrigerant Components" and "Method 2 for Showing the Mixed Formulation Composed of Four Refrigerant Components" make it possible to show the mixture formulation composed of four refrigerant components in a ternary composition diagram.

Method 1 for Showing the Mixed Formulation Composed of Four Refrigerant Components Method 1 is a method for showing a mixture formulation composed of four refrigerant components with the total concentration of the four refrigerant components taken as 100 mass %, and the concentration of each component taken as a mass %, b mass %, c mass %, and d mass %. The method comprises fixing the concentration of one refrigerant component at a mass %, and setting the concentration of the three remaining refrigerant components as b mass %, c mass %, and d mass %; and showing the respective concentrations of the three refrigerant components in a ternary composition diagram (ternary diagram) in which the total concentration thereof is shown as (100−a) mass %.

Method 2 for Showing the Mixed Formulation Composed of Four Refrigerant Components Method 2 is a method for showing a mixture formulation composed of four refrigerant components with the total concentration of the four refrigerant components taken as 100 mass %, and the concentration of each component taken as a mass %, b mass %, c mass %, and d mass %. The method comprises setting the respective concentrations of the four refrigerant components as a mass %, b mass %, and (c+d) mass % as three apparent components; showing the respective concentrations of the three components in a ternary composition diagram (ternary diagram) in which the total concentration of the three components is shown as 100 mass %; further introducing the mass ratio of c mass % to (c+d) mass %, which is $r=100\times[c/(c+d)]$; and showing the concentration of each of the three components in the ternary composition diagram for each value of r.

1.2.1 Mixed Formulation of Refrigerant Specified by Method 1

The refrigerant (mixed refrigerant) according to the present disclosure can be specified as follows by indicating the compositional ratio using Method 1.

Specifically, the refrigerant according to the present disclosure can be specified as follows:

a refrigerant that contains R32, R125, R143a, and R134a, and that is one member selected from the group consisting of refrigerant 1, refrigerant 2, refrigerant 3, and refrigerant 4, wherein the total concentration of R32, R125, R143a, and R134a is 100 mass %, the concentration of R32 is x mass %, and in a ternary composition diagram in which the total concentration of R125, R143a, and R134a is (100−x) mass %, refrigerant 1 has a compositional ratio as follows (1) −1 17.4 mass %≥x≥13.1 mass %, (1) −2 the concentration of R125, R143a, and 134a (the concentration of R125 (mass %)/the concentration of R143a (mass %)/the concentration of 134a (mass %)) falls on a point or within a triangular region that has the following points as vertices point A (0.35x+51.892/0.0/100−R32−R143a−R125), point D ($-0.4309x^2+0.0043x+130.4/0.2968x^2+0.1331x-52.681$/100−R32−R143a−R125), and point C (−2.2307x+90.59/0.0/100−R32−R125−R143a);

refrigerant 2 has a compositional ratio as follows (2) −1 22.5 mass %≥x>17.4 mass %, (2) −2 the concentration of R125, R143a, and 134a (the concentration of R125 (mass %)/the concentration of R143a (mass %)/the concentration of 134a (mass %)) falls within a quadrangular region that has the following points as vertices point A (0.3726x+51.526/0.0/100−R32−R125−R143a), point B (0.0/0.2547x+35.057/100−R32−R125−R143a), point D (0.0/−2.2158x+78.042/100−R32−R125−R143a), and point C (−2.5097x+88.978/0.0/100−R32−R125−R143a);

refrigerant 3 has a compositional ratio as follows (3) −1 27.5 mass %≥x>22.5 mass %, (3) −2 the concentration of R125, R143a, and 134a (the concentration of R125 (mass %)/the concentration of R143a (mass %)/the concentration of 134a (mass %)) falls within a quadrangular region that has the following points as vertices point A (0.36x+51.8/0.0/100−R32−R125−R143a),
point B (0.0/0.24x+35.4/100−R32−R125−R143a),
point D (0.0/−2.12x+75.867/100−R32−R125−R143a), and
point C (−2.42x+86.933/0.0/100−R32−R125−R143a); and refrigerant 4 has a compositional ratio as follows (4) −1 32.5 mass % ≥ x > 27.5 mass %,
(4) −2 the concentration of R125, R143a, and 134a (the concentration of R125 (mass %)/the concentration of R143a (mass %)/the concentration of 134a (mass %)) falls within a quadrangular region that has the following points as vertices point A (0.36x+51.8/0.0/100−R32−R125−R143a),
point B (0.0/0.24x+35.4/100−R32−R125−R143a),
point D (0.0/−2.04x+73.7/100−R32−R125−R143a), and
point C (−2.36x+85.3/0.0/100−R32−R125−R143a).

Specifically, the refrigerant according to the present disclosure is one member selected from the group consisting of refrigerant 1, refrigerant 2, refrigerant 3, and refrigerant 4 (unavoidable impurities are allowed to be present).

The following explains how to determine points A, B, C, and D according to different ranges of x. The technical meaning of points A, B, C, and D is also explained below. The concentration at each point is a value determined in Example 1, described later.

A: a compositional ratio when the GWP is 2500, and the concentration of R143a (mass %) is 0.0 mass %.
B: a compositional ratio when the GWP is 2500, and the concentration of R125 (mass %) is 0.0 mass %.
C: a compositional ratio when the refrigerating capacity is 95% relative to R404A (a refrigerating capacity relative to R404A: 95%), and the concentration of R143a (mass %) is 0.0 mass %.
D: a compositional ratio when the refrigerating capacity is 95% relative to R404A (a refrigerating capacity relative to R404A: 95%), and the GWP is 2500 or the concentration of R143a (mass %) is 0.0 mass %.

(1) How to Determine Points A, B, C, and D
(1-1) Point A
17.4 mass % ≥ x ≥ 13.1 mass %

When the concentration of R32 is 13.1 mass %, point A on the ternary composition diagram in which the total concentration of R125, R143a, and 134a is (100−x) mass % is (the concentration of R125 (mass %)/the concentration of R143a (mass %)/the concentration of 134a (mass %))=(56.5/0.0/30.4).

When the concentration of R32 is 15.0 mass %, point A on the ternary composition diagram in which the total concentration of R125, R143a, and 134a is (100−x) mass % is (the concentration of R125 (mass %)/the concentration of R143a (mass %)/the concentration of 134a (mass %))=(57.1/0.0/27.9).

When the concentration of R32 is 17.4 mass %, point A on the ternary composition diagram in which the total concentration of R125, R143a, and 134a is (100−x) mass % is (the concentration of R125 (mass %)/the concentration of R143a (mass %)/the concentration of 134a (mass %))=(58.0/0.0/24.6).

Thus, when the total concentration of R32, R125, R143a, and 134a is 100 mass %, and the concentration of R125 is y mass %, the formula of the regression line determined from these three points plotted on xy coordinates is expressed as y=0.35x+51.892.

Additionally, because the concentration of R143a at point A is 0.0 mass %, the concentration of R134a at point A is expressed by (100−the concentration of R32 (mass %)−the concentration of R125 (mass %)).

As described above, point A (the concentration of R125 (mass %)/the concentration of R143a (mass %)/the concentration of 134a (mass %)) on a ternary composition diagram in which the total concentration of R125, R143a, and R134a is (100−x) is expressed by (0.35x×51.892/0.0/100−the concentration of R32−the concentration of R125).

22.5 mass % ≥ x > 17.4 mass %
27.5 mass % ≥ x > 22.5 mass %
32.5 mass % ≥ x > 27.5 mass %

The same calculation was performed for the ranges of X above. Table 1 below illustrates the results of point A (the concentration of R125 (mass %)/the concentration of R143a (mass %)/the concentration of 134a (mass %)) for each range of concentration x.

TABLE 1

| | Point A | | | | | | | | |
|---|---|---|---|---|---|---|---|---|---|
| Item | 17.4 ≥ x ≥ 13.1 | | | 22.5 ≥ x ≥ 17.4 | | | 27.5 ≥ x ≥ 22.5 | | |
| R32 | 13.1 | 15.0 | 17.4 | 17.4 | 20.0 | 22.5 | 22.5 | 25.0 | 27.5 |
| R125 | 56.5 | 57.1 | 58.0 | 58.0 | 59.0 | 59.9 | 59.9 | 60.8 | 61.7 |
| R143a | 0.0 | 0.0 | 0.0 | 0.0 | 0.0 | 0.0 | 0.0 | 0.0 | 0.0 |
| R134a | 30.4 | 27.9 | 24.6 | 24.6 | 21.0 | 17.6 | 17.6 | 14.2 | 10.8 |
| R32 | x | | | x | | | x | | |
| Approximation Formula for R125 | 0.35x + 51.892 | | | 0.3726x + 51.526 | | | 0.36x + 51.8 | | |
| Approximation Formula for R143a | 0 | | | 0 | | | 0 | | |
| Approximation Formula for R134a | 100 − R32 − R125 | | | 100 − R32 − R125 | | | 100 − R32 − R125 | | |

| Item | 32.5 ≥ x ≥ 27.5 | | |
|---|---|---|---|
| R32 | 27.5 | 30.0 | 32.5 |
| R125 | 61.7 | 62.6 | 63.5 |
| R143a | 0.0 | 0.0 | 0.0 |
| R134a | 10.8 | 7.4 | 4.0 |
| R32 | x | | |
| Approximation Formula for R125 | 0.36x + 51.8 | | |
| Approximation Formula for R143a | 0 | | |
| Approximation Formula for R134a | 100 − R32 − R125 | | |

(1-2) Points B, C, and D

Points B, C, and D were also determined in the same manner as in point A. Tables 2 to 4 below illustrate the results.

TABLE 2

| | Point B | | | | | | | | |
|---|---|---|---|---|---|---|---|---|---|
| Item | $17.4 \geq x \geq 13.1$ | | | $22.5 \geq x \geq 17.4$ | | | $27.5 \geq x \geq 22.5$ | | |
| R32 | 13.1 | 15.0 | 17.4 | 17.4 | 20.0 | 22.5 | 22.5 | 25.0 | 27.5 |
| R125 | 0.0 | 0.0 | 0.0 | 0.0 | 0.0 | 0.0 | 0.0 | 0.0 | 0.0 |
| R143a | 38.4 | 38.9 | 39.5 | 39.5 | 40.1 | 40.8 | 40.8 | 41.4 | 42.0 |
| R134a | 48.5 | 46.1 | 43.1 | 43.1 | 39.9 | 36.7 | 36.7 | 33.6 | 30.5 |
| R32 | x | | | x | | | x | | |
| Approximation Formula for R125 | 0 | | | 0 | | | 0 | | |
| Approximation Formula for R143a | 0.2556x + 35.057 | | | 0.2547x + 35.047 | | | 0.24x + 35.4 | | |
| Approximation Formula for R134a | 100 − R32 − R143a | | | 100 − R32 − R143a | | | 100 − R32 − R143a | | |

| Item | $32.5 \geq x \geq 27.5$ | | |
|---|---|---|---|
| R32 | 27.5 | 30.0 | 32.5 |
| R125 | 0.0 | 0.0 | 0.0 |
| R143a | 42.0 | 42.6 | 43.2 |
| R134a | 30.5 | 27.4 | 24.3 |
| R32 | | x | |
| Approximation Formula for R125 | | 0 | |
| Approximation Formula for R143a | | 0.24x + 35.4 | |
| Approximation Formula for R134a | | 100 − R32 − R143a | |

TABLE 3

| | Point C | | | | | | | | |
|---|---|---|---|---|---|---|---|---|---|
| Item | $17.4 \geq x \geq 13.1$ | | | $22.5 \geq x \geq 17.4$ | | | $27.5 \geq x \geq 22.5$ | | |
| R32 | 13.1 | 15.0 | 17.4 | 17.4 | 20.0 | 22.5 | 22.5 | 25.0 | 27.5 |
| R125 | 56.5 | 51.5 | 45.3 | 45.3 | 38.8 | 32.5 | 32.5 | 26.4 | 20.4 |
| R143a | 0.0 | 0.0 | 0.0 | 0.0 | 0.0 | 0.0 | 0.0 | 0.0 | 0.0 |
| R134a | 30.4 | 33.5 | 37.3 | 37.3 | 41.2 | 45.0 | 45.0 | 48.6 | 52.1 |
| R32 | x | | | x | | | x | | |
| Approximation Formula for R125 | −2.6037x + 90.59 | | | −2.5097x + 88.978 | | | −2.42x + 86.933 | | |
| Approximation Formula for R143a | 0 | | | 0 | | | 0 | | |
| Approximation Formula for R134a | 100 − R32 − R125 | | | 100 − R32 − R125 | | | 100 − R32 − R125 | | |

| Item | $32.5 \geq x \geq 27.5$ | | |
|---|---|---|---|
| R32 | 27.5 | 30.0 | 32.5 |
| R125 | 20.4 | 14.5 | 8.6 |
| R143a | 0.0 | 0.0 | 0.0 |
| R134a | 52.1 | 55.5 | 58.9 |
| R32 | | x | |
| Approximation Formula for R125 | | −2.36x + 85.3 | |
| Approximation Formula for R143a | | 0 | |
| Approximation Formula for R134a | | 100 − R32 − R125 | |

TABLE 4

| | Point D | | | | | | | | |
|---|---|---|---|---|---|---|---|---|---|
| Item | $17.4 \geq x \geq 13.1$ | | | $22.5 \geq x \geq 17.4$ | | | $27.5 \geq x \geq 22.5$ | | |
| R32 | 13.1 | 15.0 | 17.4 | 17.4 | 20.0 | 22.5 | 22.5 | 25.0 | 27.5 |
| R125 | 56.5 | 33.5 | 0.0 | 0.0 | 0.0 | 0.0 | 0.0 | 0.0 | 0.0 |
| R143a | 0.0 | 16.1 | 39.5 | 39.5 | 33.7 | 28.2 | 28.2 | 22.8 | 17.6 |
| R134a | 30.4 | 35.4 | 43.1 | 43.1 | 46.3 | 49.3 | 49.3 | 52.2 | 54.9 |
| R32 | x | | | x | | | x | | |
| Approximation Formula for R125 | −0.4309x2 + 0.0043x + 130.4 | | | 0 | | | 0 | | |
| Approximation Formula for R143a | 0.2968x2 + 0.1331x − 52.681 | | | −2.2158x + 78.042 | | | −2.12x + 75.867 | | |
| Approximation Formula for R134a | 100 − R32 − R125 − R143a | | | 100 − R32 − R125 − R143a | | | 100 − R32 − R125 − R143a | | |

TABLE 4-continued

| | Point D | | |
|---|---|---|---|
| Item | | $32.5 \geq x \geq 27.5$ | |
| R32 | 27.5 | 30.0 | 32.5 |
| R125 | 0.0 | 0.0 | 0.0 |
| R143a | 17.6 | 12.5 | 7.4 |
| R134a | 54.9 | 57.5 | 60.1 |
| R32 | | x | |
| Approximation Formula for R125 | | 0 | |
| Approximation Formula for R143a | | −2.04x + 73.7 | |
| Approximation Formula for R134a | | 100 − R32 − R125 − R143a | |

Figure 2:
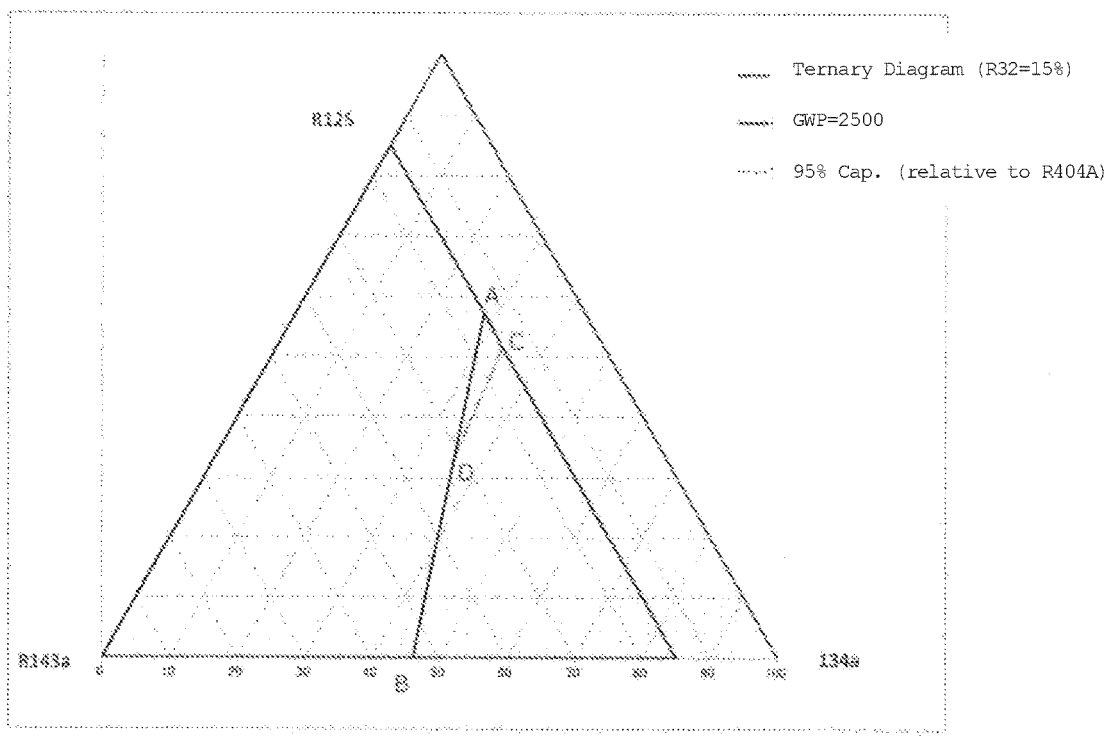
FIG. 2 is a diagram illustrating the compositional ratio of a refrigerant contained in the composition according to the present disclosure (the compositional ratio falls within a triangular region that has points A, D, and C as vertices).
Figure 3:
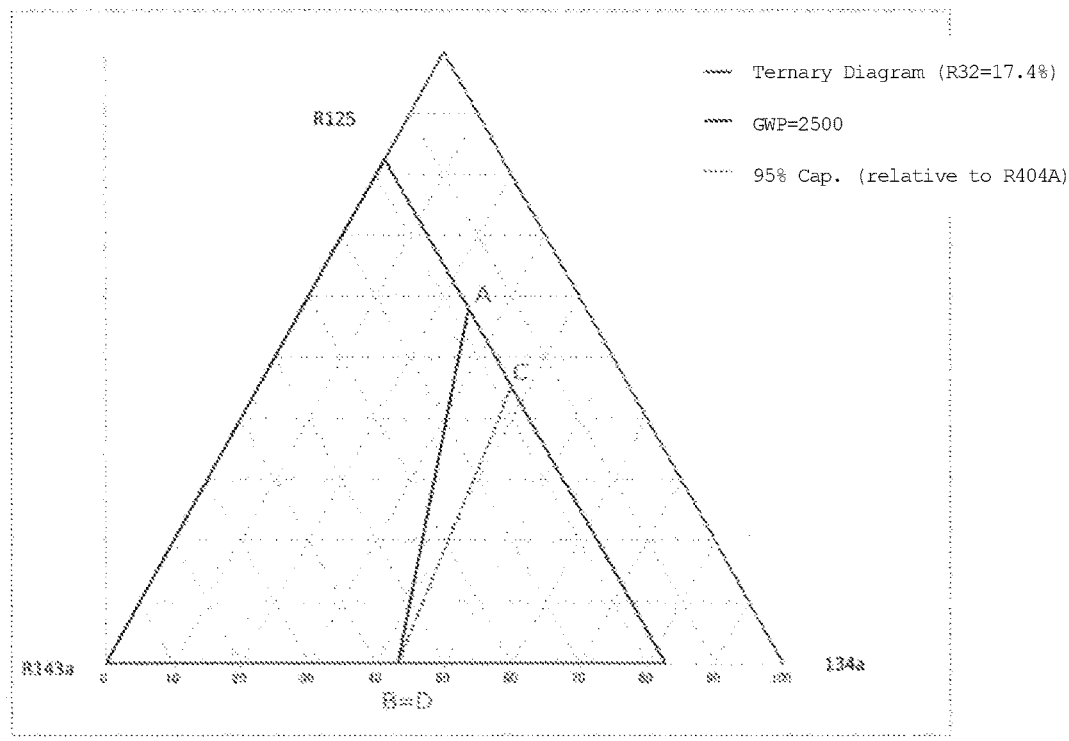
FIG. 3 is a diagram illustrating the compositional ratio of a refrigerant contained in the composition according to the present disclosure (the compositional ratio falls within a triangular region that has points A, D (=B), and C as vertices).
Figure 4:
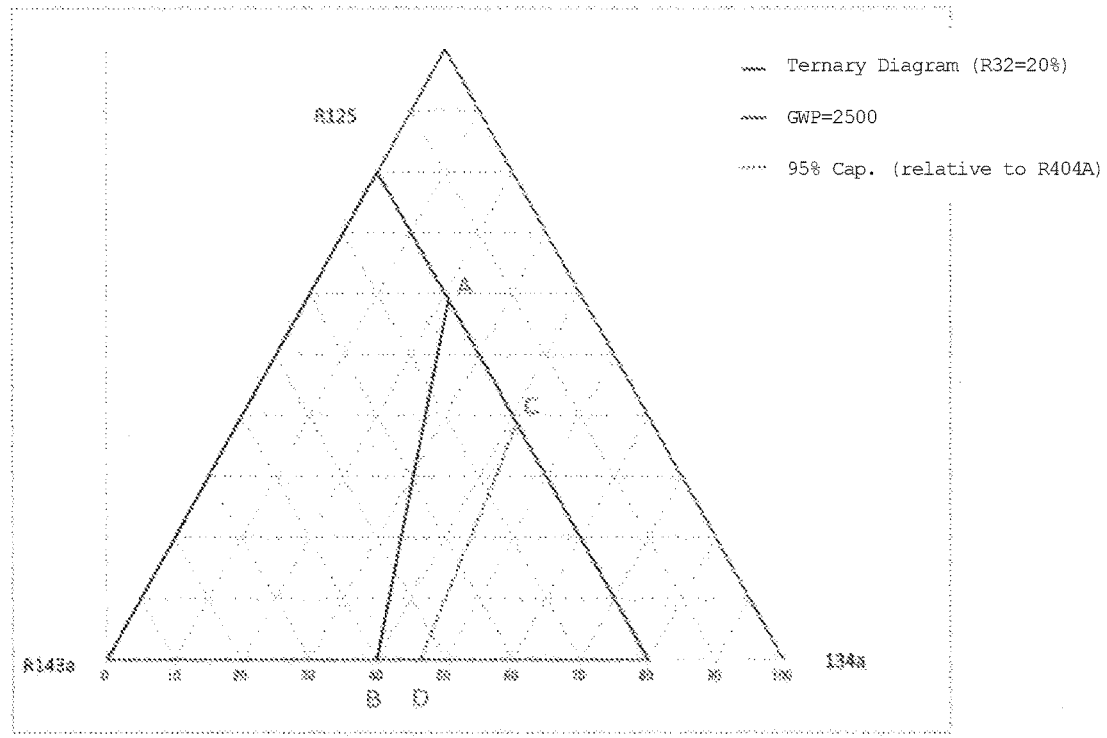
FIG. 4 is a diagram illustrating the compositional ratio of a refrigerant contained in the composition according to the present disclosure (the compositional ratio falls within a quadrangular region that has points A, B, D, and C as vertices).
Figure 5:
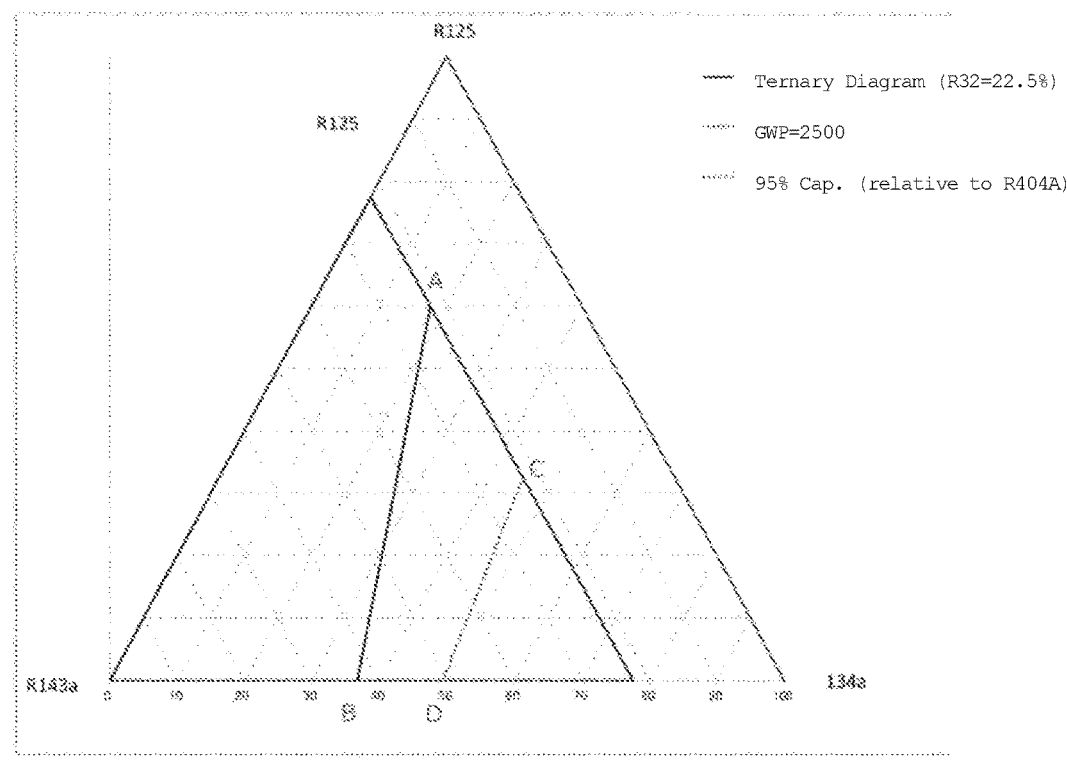
FIG. 5 is a diagram illustrating the compositional ratio of a refrigerant contained in the composition according to the present disclosure (the compositional ratio falls within a quadrangular region that has points A, B, D, and C as vertices).
Figure 6:
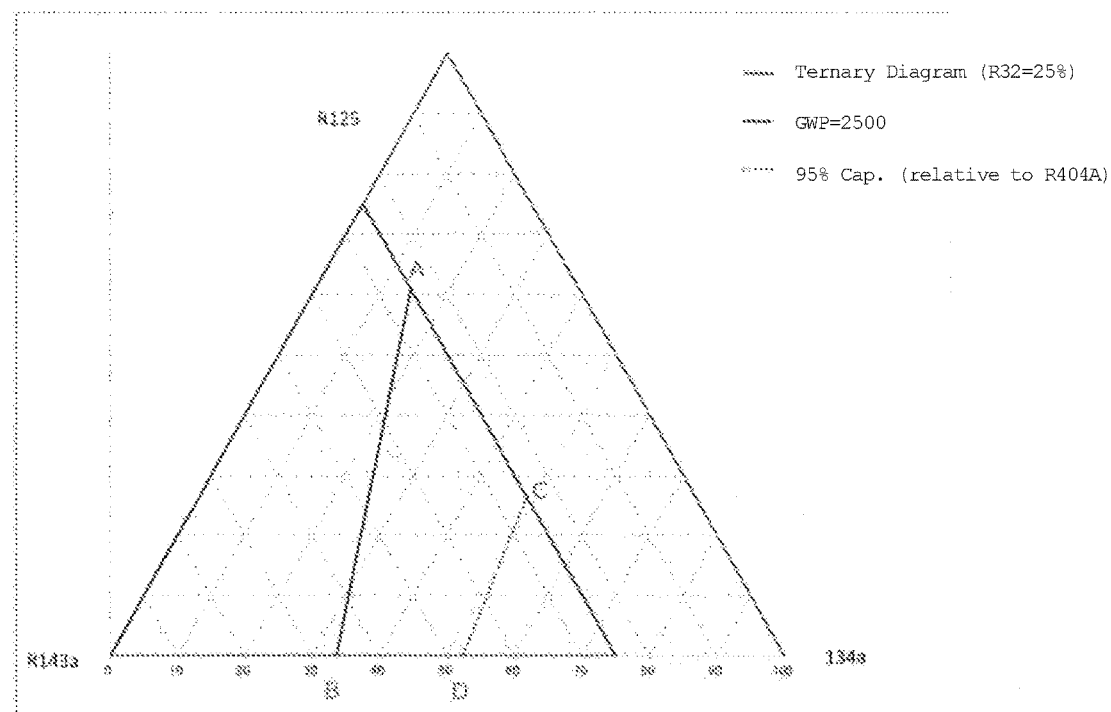
FIG. 6 is a diagram illustrating the compositional ratio of a refrigerant contained in the composition according to the present disclosure (the compositional ratio falls within a quadrangular region that has points A, B, D, and C as vertices).
Figure 7:
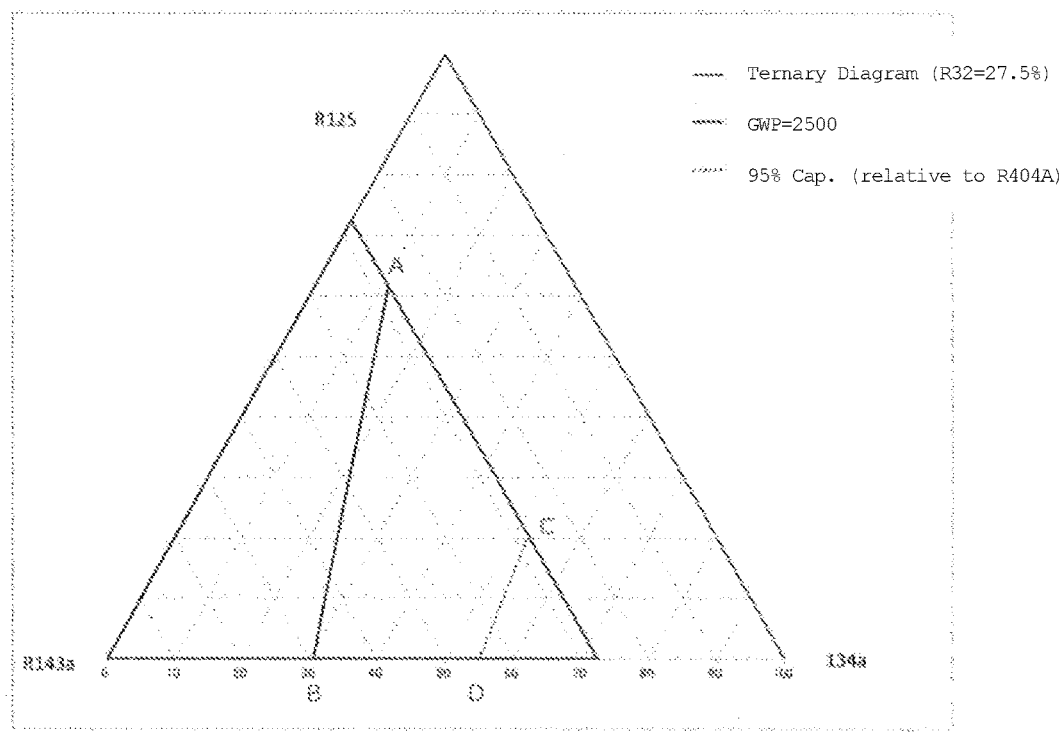
FIG. 7 is a diagram illustrating the compositional ratio of a refrigerant contained in the composition according to the present disclosure (the compositional ratio falls within a quadrangular region that has points A, B, D and C as vertices).
Figure 8:
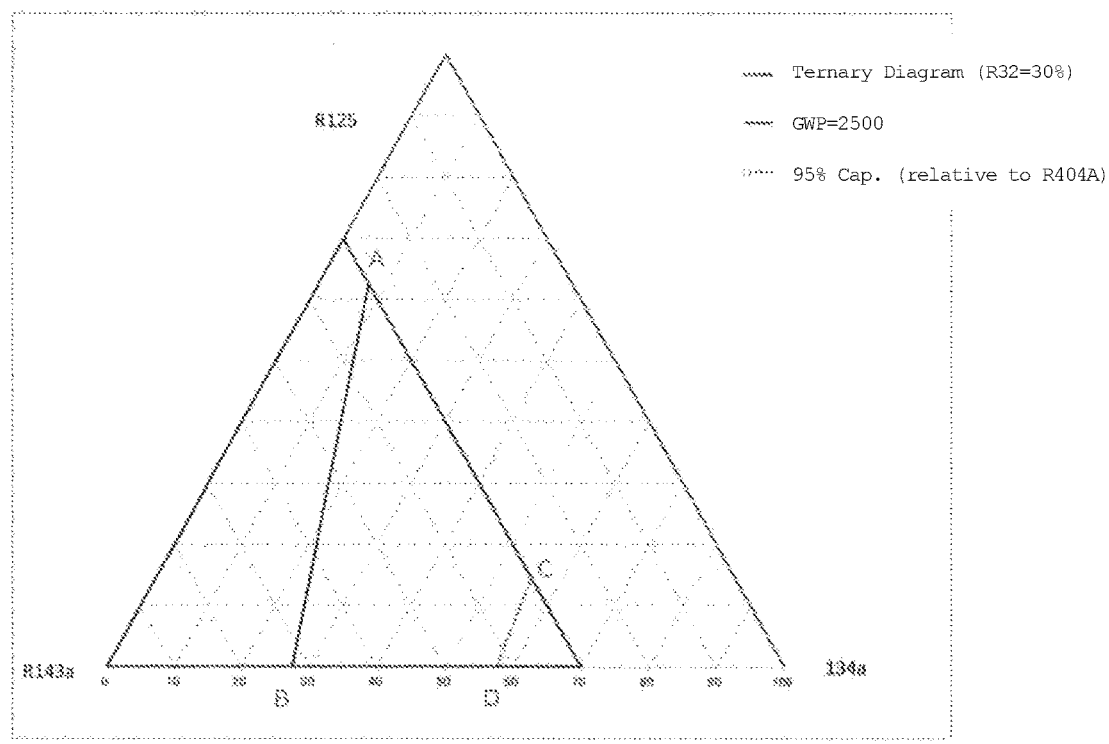
FIG. 8 is a diagram illustrating the compositional ratio of a refrigerant contained in the composition according to the present disclosure (the compositional ratio falls within a quadrangular region that has points A, B, D, and C as vertices).
Figure 9:
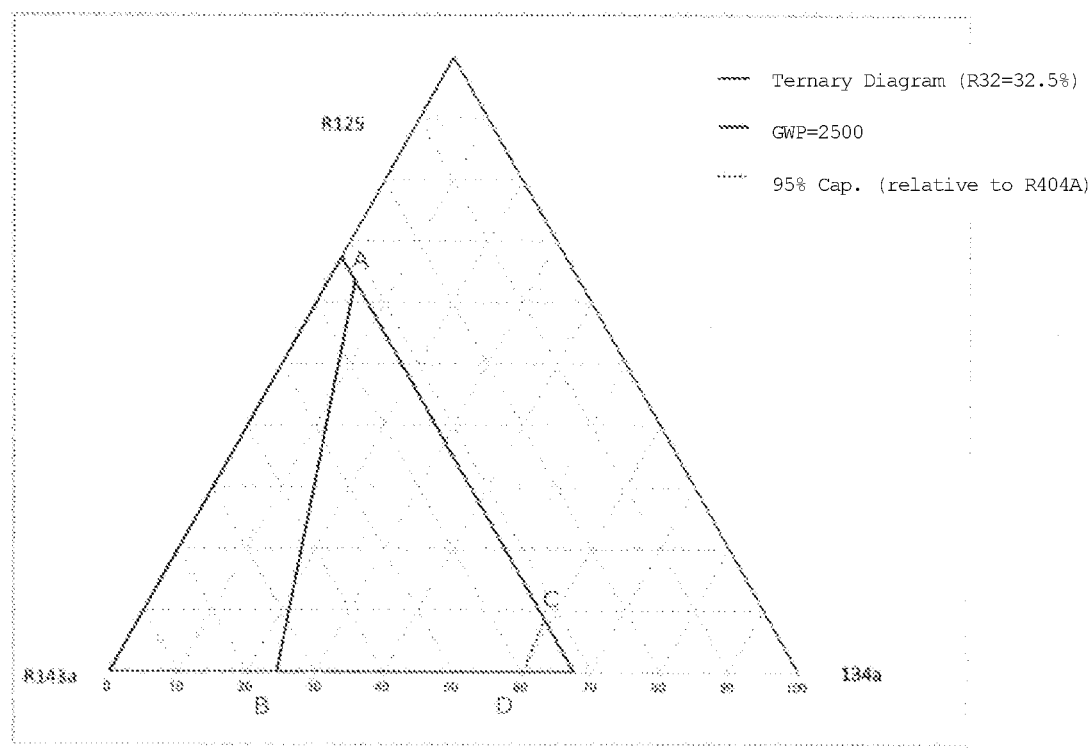
FIG. 9 is a diagram illustrating the compositional ratio of a refrigerant contained in the composition according to the present disclosure (the compositional ratio falls within a quadrangular region that has points A, B, D, and C as vertices).

In the ternary composition diagram in which the total concentration of R125, R143a, and R134a is (100−x), a set of points at which GWP=2500 is expressed as a straight line that connects point A and point B, which is indicated as a function of x where R32=x. For example, in the ternary composition diagrams of FIGS. 1 to 9, the GWP is 2500 or less in the region from the straight line toward the vertex of R134a.

In the ternary composition diagram in which the total concentration of R125, R143a, and R134a is (100−x), a set of points at which the refrigerating capacity relative to R404A is 95% is approximated to a straight line that connects point C and point D, which is indicated as a function of x where R32=x. For example, in the ternary composition diagrams of FIGS. 1 to 9, the refrigerating capacity relative to R404A is 95% or more in the region from the approximate straight line toward the vertex of R125.

1.2.2 Mixture Formulation of Refrigerant Specified by Method 2

The refrigerant (mixed refrigerant) according to the present disclosure can be specified as below by expressing the compositional ratio using Method 2.

Specifically, the refrigerant according to the present disclosure can be specified as follows:

a refrigerant that contains R32, R125, R143a, and R134a, and that is one member selected from the group consisting of refrigerant A, refrigerant B, and refrigerant C, wherein the total concentration of R32, R125, and (R143a+R134a) is 100 mass %, the ratio of the concentration of R143a to the concentration of (R143a+R134a) is r=100×[R143a/(R143a+R134a)], and in a ternary composition diagram in which the total concentration of R32, R125, and (R143a+R134a) is 100 mass %, refrigerant A has a compositional ratio as follows (1) −1 $11 \geq r \geq 0$, (1) −2 the concentration of R32, R125, and (R143a+R134a) (the concentration of R32 (mass %)/the concentration of R125 (mass %)/the concentration of (R143a+R134a) (mass %)) falls within a triangular region that has the following points as vertices point $I_{0 \leq r \leq 11}$ (32.5/−0.0636r+63.5/100−R32−R125),
point $G_{0 \leq r \leq 11}$ (0.0455r+13.1/−0.5091r+56.5/100−R32−R125), and
point $J_{0 \leq r \leq 11}$ (32.5/−0.8455r+9.3/100−R32−R125); refrigerant B has a compositional ratio as follows (2) −1 $35.2 \geq r > 11$, (2) −2 the concentration of R32, R125, and (R143a+R134a) (the concentration of R32 (mass %)/the concentration of R125 (mass %)/the concentration of (R143a+134a) (mass %)) falls within a quadrangular region that has the following points as vertices point $I_{11 < r \leq 35.2}$ (32.5/−0.003r²−0.0072r+63.239/100−R32−R125),
point $G_{11 < r \leq 35.2}$ (0.001r²+0.0287r+13.165/−0.0188r²−0.0718r+53.97/100−R32−R125),
point $H_{11 < r \leq 35.2}$ (−0.0014r²−0.3292r+36.287/0.0/100−R32−R125), and
point $J_{11 < r \leq 35.2}$ (32.5/0.0/67.5); and refrigerant C has a compositional ratio as follows (3) −1 $47.8 \geq r > 35.2$, (3) −2 the concentration of R32, R125, and (R143a+R134a) (the concentration of R32 (mass %)/the concentration of R125 (mass %)/the concentration of (R143a+R134a) (mass %)) falls within a quadrangular region or triangular region that has the following points as vertices point $I_{35.2 < r \leq 47.8}$ (32.5/−0.0169r²+0.9999r+45.073/100−R32−R125),
point $G_{35.2 < r \leq 47.8}$ (0.0041r²−0.1818r+16.716/−0.077r²+4.163r−23.0/100−R32−R125),
point $H_{35.2 < r \leq 47.8}$ (−0.0011r²−0.3491r+36.712/0.0/100−R32−R125), and
point $J_{35.2 < r \leq 47.8}$ (32.5/0.0/67.5).

Specifically, the refrigerant according to the present disclosure is one member selected from the group consisting of refrigerant A, refrigerant B, and refrigerant C (unavoidable impurities are allowed to be present).

The following explains how to determine points $I_r$, $G_r$, $J_r$, and $H_r$ according to different ranges of r. The technical meaning of points $I_{0 \leq r \leq 47.8}$, $G_{0 \leq r \leq 47.8}$, $H_{0 \leq r \leq 47.8}$, and $J_{0 \leq r \leq 47.8}$ is also explained below. The concentration at each point is a value determined in Example 2, described later.

$I_{0 \leq r \leq 47.8}$: a compositional ratio when the GWP is 2500, and the concentration of R32 (mass %) is 32.5 mass %.

$G_{0 \leq r \leq 47.8}$: a compositional ratio when the GWP is 2500, and the refrigerating capacity relative to R404A is 95%.

$H_{0 \leq r \leq 47.8}$: a compositional ratio when the refrigerating capacity relative to R404A is 95%, and the concentration of R125 (mass %) is 0.0 mass %.

$J_{0 \leq r \leq 47.8}$: a compositional ratio when the refrigerating capacity relative to R404A is 95%, and the concentration of R32 (mass %) is 32.5 mass %.

(2) How to Determine Points $I_r$, $G_r$, $J_r$, and $H_r$ (2-1) Point $I_{0 \leq r \leq 47.8}$ On the premise that r=100×[R143a/(R143a+R134a)], which is a relational expression between the concentration of R143a (mass %) and the concentration of R134a (mass %), $I_{r=0}$ is (the concentration of R32 (mass %)/the concentration of R125 (mass %)/the concentration of (R143a+R134a) (mass %))=(32.5/63.5/4.0), and $I_{r=11}$ is (the concentration of R32 (mass %)/the concentration of R125 (mass %)/the concentration of (R143a+R134a) (mass %)) (32.5/

62.8/4.7) in the ternary composition diagram that shows the concentration of R32, R125, and (R143a+R134a). Thus, under $11 \geq r \geq 0$, the concentration of R32 is 32.5 mass %; the concentration of R125 is expressed by an approximate formula: R125 0.0636r+4.00; the concentration of (R143a+R134a) is expressed by 100−the concentration of R32−the concentration of R125; the concentration of R143a is expressed by r(100−R32−R125)/100 mass %; and the concentration of R134a is (100−R32−R125−R143a) mass %. Table 5 illustrates the values of $I_{0 \leq r \leq 11}$, $I_{11 < r \leq 35.2}$, and $I_{35.2 < r \leq 47.8}$ when $35.2 \geq r > 11$ and $47.8 \geq r > 35.2$.

TABLE 5

Point I

| Item | $I_{0 \leq r \leq 11}$ | | $I_{11 \leq r \leq 35.2}$ | | | $I_{35.2 \leq r \leq 47.8}$ | | |
|---|---|---|---|---|---|---|---|---|
|  | 0 | 11 | 11 | 25 | 35.2 | 35.2 | 42.5 | 47.8 |
| R32 | 32.5 | 32.5 | 32.5 | 32.5 | 32.5 | 32.5 | 32.5 | 32.5 |
| R125 | 63.5 | 62.8 | 62.8 | 61.2 | 59.3 | 59.3 | 57.0 | 54.3 |
| R143a + R134a | 4.0 | 4.7 | 4.7 | 6.3 | 8.2 | 8.2 | 10.5 | 13.2 |
| R32 | 32.5 | | 32.5 | | | 32.5 | | |
| R125 | −0.0636r + 63.5 | | −0.003r2 − 0.0072r + 63.239 | | | −0.0169r2 + 0.9999r + 45.073 | | |
| R143a + R134a | 100 − R32 − R125 | | 100 − R32 − R125 | | | 100 − R32 − R125 | | |
| R143a | r(100 − R32 − R125)/100 | | r(100 − R32 − R125)/100 | | | r(100 − R32 − R125)/100 | | |
| R134a | 100 − R32 − R125 − R143a | | 100 − R32 − R125 − R143a | | | 100 − R32 − R125 − R143a | | |

(2-2) Point $G_{0 \leq r \leq 47.8}$, Point $J_{0 \leq r \leq 47.8}$, and Point $H_{0 \leq r \leq 47.8}$ Point $G_{0 \leq r \leq 47.8}$, point $J_{0 \leq r \leq 47.8}$, and point $H_{0 \leq r \leq 47.8}$ were also determined in the same manner as in point $I_{0 \leq r \leq 47.8}$. Tables 6 to 8 below illustrate the results.

TABLE 6

Point G

| Item | $G_{0 \leq r \leq 11}$ | | $G_{11 < r \leq 35.2}$ | | | $G_{35.2 \leq r \leq 47.8}$ | | |
|---|---|---|---|---|---|---|---|---|
|  | 0 | 11 | 11 | 25 | 35.2 | 35.2 | 42.5 | 47.8 |
| R32 | 13.1 | 13.6 | 13.6 | 14.5 | 15.4 | 15.4 | 16.4 | 17.4 |
| R125 | 56.5 | 50.9 | 50.9 | 40.4 | 28.1 | 28.1 | 14.8 | 0.0 |
| R143a + R134a | 30.4 | 35.5 | 35.5 | 45.1 | 56.5 | 56.5 | 68.8 | 82.6 |
| R32 | 0.0455r + 13.1 | | 0.001r2 + 0.0287r + 13.165 | | | 0.0041r2 − 0.1818r + 16.716 | | |
| R125 | −0.5091r + 56.5 | | −0.0188r2 − 0.0718r + 53.97 | | | −0.077r2 + 4.163r − 23.0 | | |
| R143a + R134a | 100 − R32 − R125 | | 100 − R32 − R125 | | | 100 − R32 − R125 | | |
| R143a | r(100 − R32 − R125)/100 | | r(100 − R32 − R125)/100 | | | r(100 − R32 − R125)/100 | | |
| R134a | 100 − R32 − R125 − R143a | | 100 − R32 − R125 − R143a | | | 100 − R32 − R125 − R143a | | |

TABLE 7

Point J

| Item | $J_{0 \leq r \leq 11}$ | | $J_{11 < r \leq 35.2}$ | | | $J_{35.2 \leq r \leq 47.8}$ | | |
|---|---|---|---|---|---|---|---|---|
|  | 0 | 11 | 11 | 25 | 35.2 | 35.2 | 42.5 | 47.8 |
| R32 | 32.5 | 32.5 | 32.5 | 32.5 | 32.5 | 32.5 | 32.5 | 32.5 |
| R125 | 9.3 | 0.0 | 0.0 | 0.0 | 0.0 | 0.0 | 0.0 | 0.0 |
| R143a + R134a | 58.2 | 67.5 | 67.5 | 67.5 | 67.5 | 67.5 | 67.5 | 67.5 |
| R32 | 32.5 | | 32.5 | | | 32.5 | | |
| R125 | −0.8455r + 9.3 | | 0 | | | 0 | | |
| R143a + R134a | 100 − R32 − R125 | | 67.5 | | | 67.5 | | |
| R143a | r(100 − R32 − R125)/100 | | r(100 − R32 − R125)/100 | | | r(100 − R32 − R125)/100 | | |
| R134a | 100 − R32 − R125 − R143a | | 100 − R32 − R125 − R143a | | | 100 − R32 − R125 − R143a | | |

TABLE 8

Point H

| Item | $H_{0 \leq r \leq 11}$ | | $H_{11 < r \leq 35.2}$ | | | $H_{35.2 \leq r \leq 47.8}$ | | |
|---|---|---|---|---|---|---|---|---|
|  | 0 | 11 | 11 | 25 | 35.2 | 35.2 | 42.5 | 47.8 |
| R32 | 36.3 | 32.5 | 32.5 | 27.2 | 23.0 | 23.0 | 19.8 | 17.4 |
| R125 | 0.0 | 0.0 | 0.0 | 0.0 | 0.0 | 0.0 | 0.0 | 0.0 |
| R143a + R134a | 63.7 | 67.5 | 67.5 | 72.8 | 77.0 | 77.0 | 80.2 | 82.6 |

TABLE 8-continued

| | Point H | | | | | | | |
|---|---|---|---|---|---|---|---|---|
| | $H_{0 \leq r \leq 11}$ | | $H_{11 \leq r \leq 35.2}$ | | | $H_{35.2 \leq r \leq 47.8}$ | | |
| Item | 0 | 11 | 11 | 25 | 35.2 | 35.2 | 42.5 | 47.8 |
| R32 | −0.3455r + 36.3 | | −0.0014r2 − 0.3292r + 36.287 | | | −0.0011r2 − 0.3491r + 36.712 | | |
| R125 | 0 | | 0 | | | 0 | | |
| R143a + R134a | 100 − R32 − R125 | | 100 − R32 − R125 | | | 100 − R32 − R125 | | |
| R143a | r(100 − R32 − R125)/100 | | r(100 − R32 − R125)/100 | | | r(100 − R32 − R125)/100 | | |
| R134a | 100 − R32 − R125 − R143a | | 100 − R32 − R125 − R143a | | | 100 − R32 − R125 − R143a | | |

Figure 10:
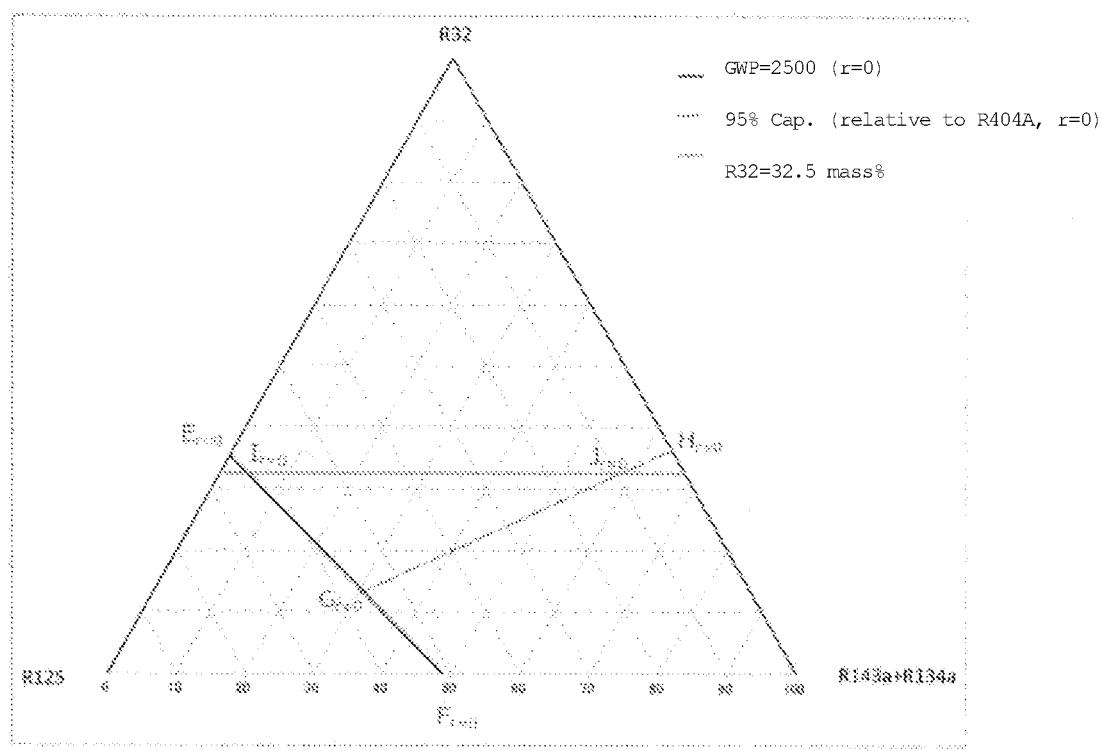
FIG. 10 is a diagram illustrating the compositional ratio of a refrigerant contained in the composition according to the present disclosure (the compositional ratio falls within a triangular region that has points $I_{r=0}$, $G_{r=0}$, and $J_{r=0}$ as vertices).
Figure 11:
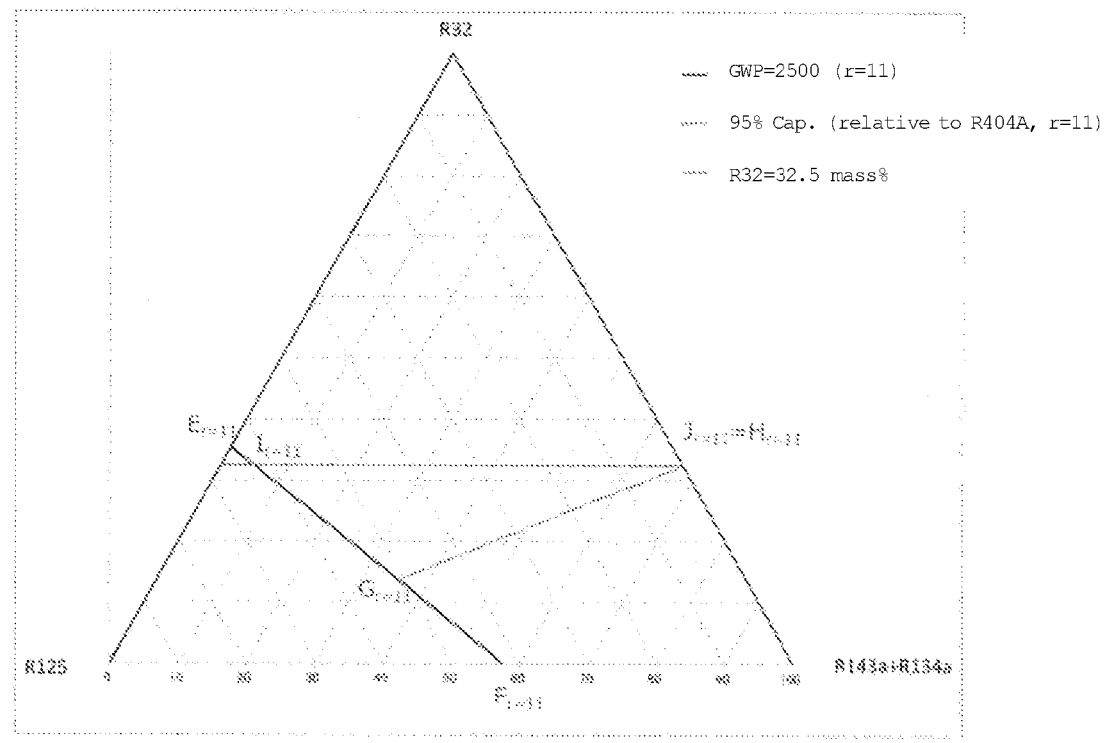
FIG. 11 is a diagram illustrating the compositional ratio of a refrigerant contained in the composition according to the present disclosure (the compositional ratio falls within a triangular region that has points $I_{r=11}$, $G_{r=11}$, and $J_{r=11}$ (=$H_{r=11}$) as vertices).
Figure 12:
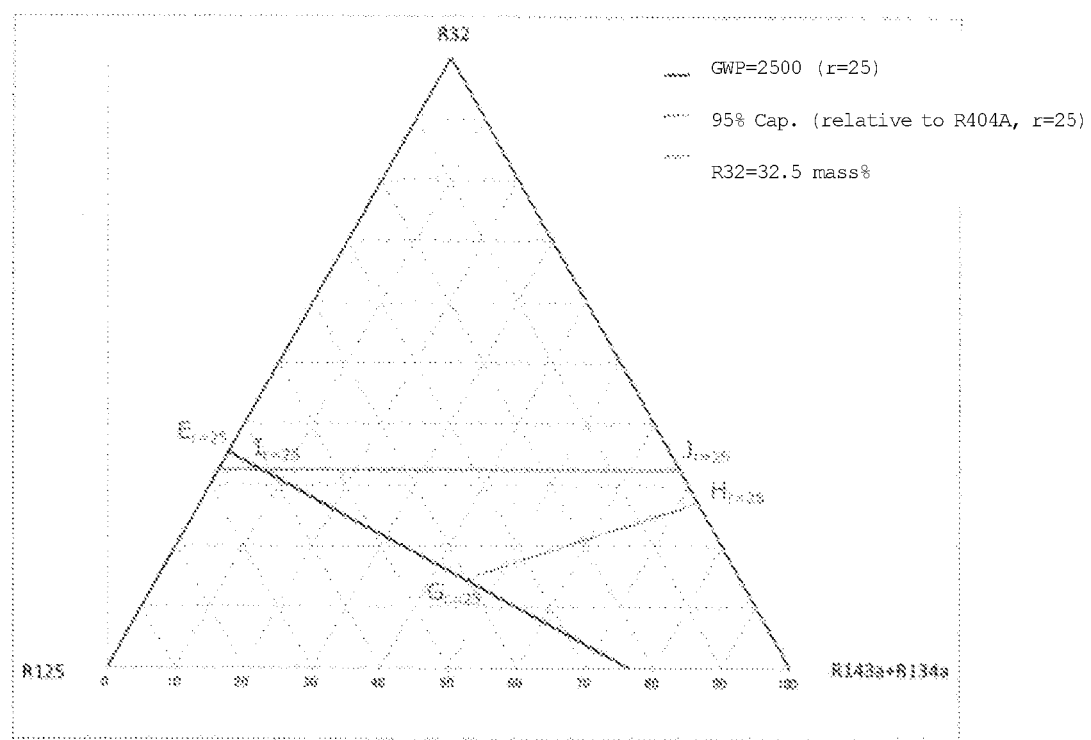
FIG. 12 is a diagram illustrating the compositional ratio of a refrigerant contained in the composition according to the present disclosure (the compositional ratio falls within a quadrangular region that has points $I_{r=25}$, $G_{r=25}$, $H_{r=25}$, and $J_{r=25}$ as vertices).
Figure 13:
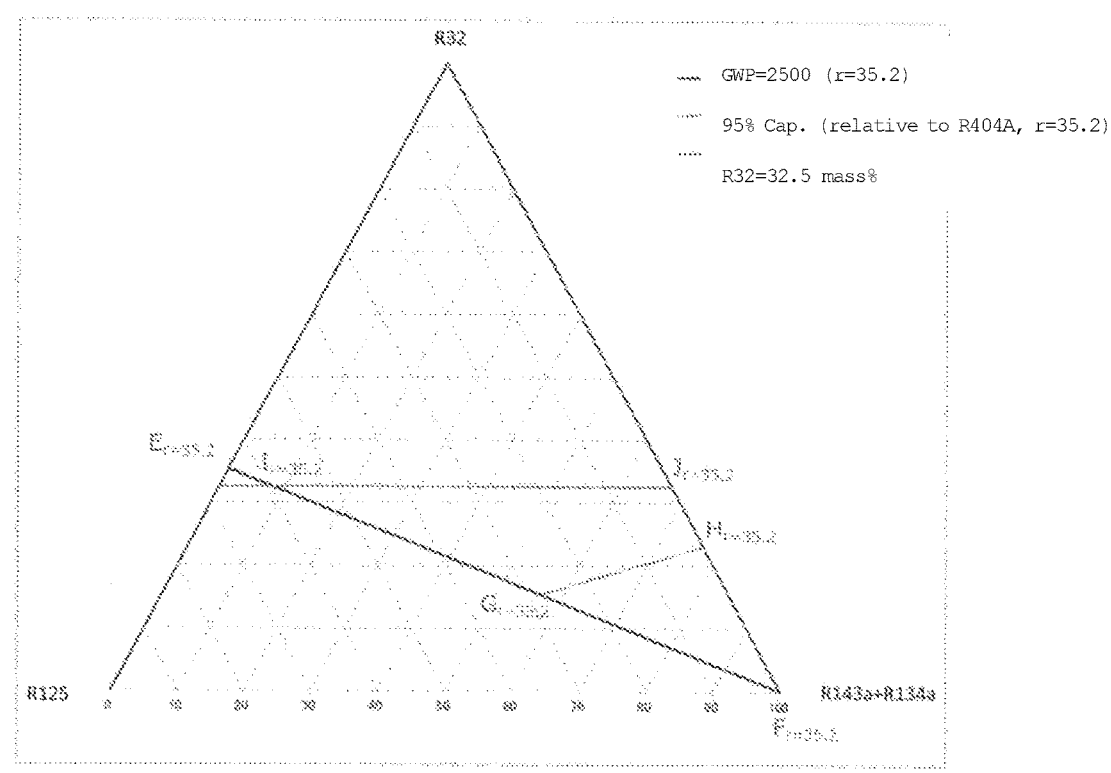
FIG. 13 is a diagram illustrating the compositional ratio of a refrigerant contained in the composition according to the present disclosure (the compositional ratio falls within a quadrangular region that has points $I_{r=35.2}$, $G_{r=35.2}$, $H_{r=35.2}$, and $J_{r=35.2}$ as vertices).
Figure 14:
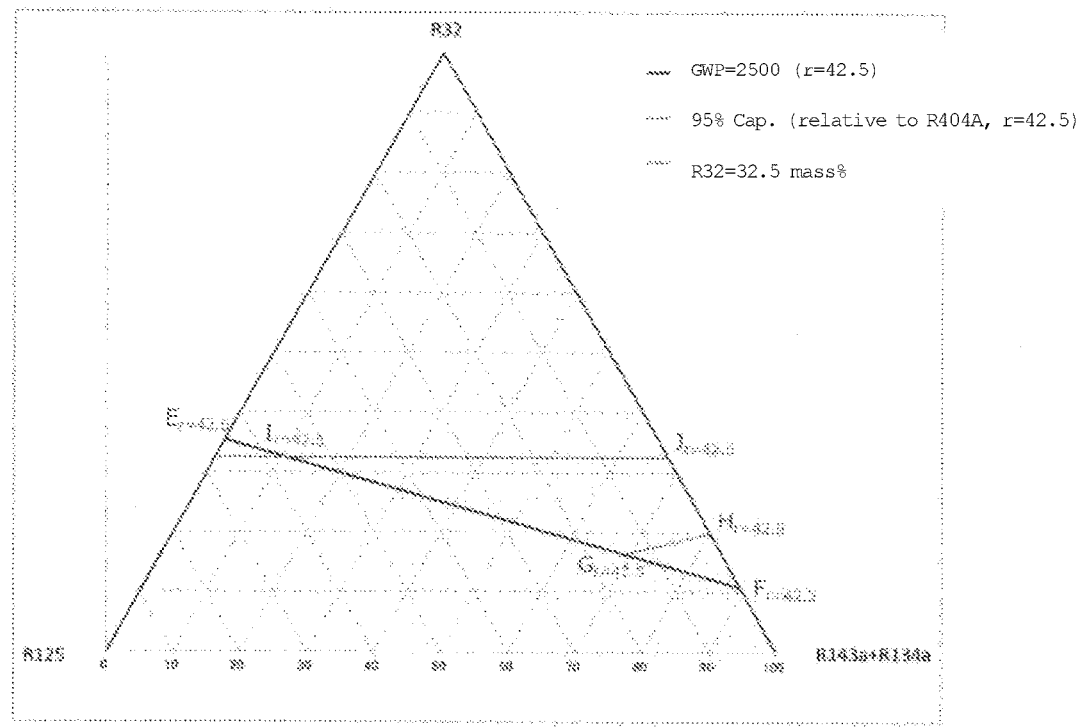
FIG. 14 is a diagram illustrating the compositional ratio of a refrigerant contained in the composition according to the present disclosure (the compositional ratio falls within a quadrangular region that has points $I_{r=42.5}$, $G_{r=42.5}$, $H_{r=42.5}$, and $J_{r=42.5}$ as vertices).
Figure 15:
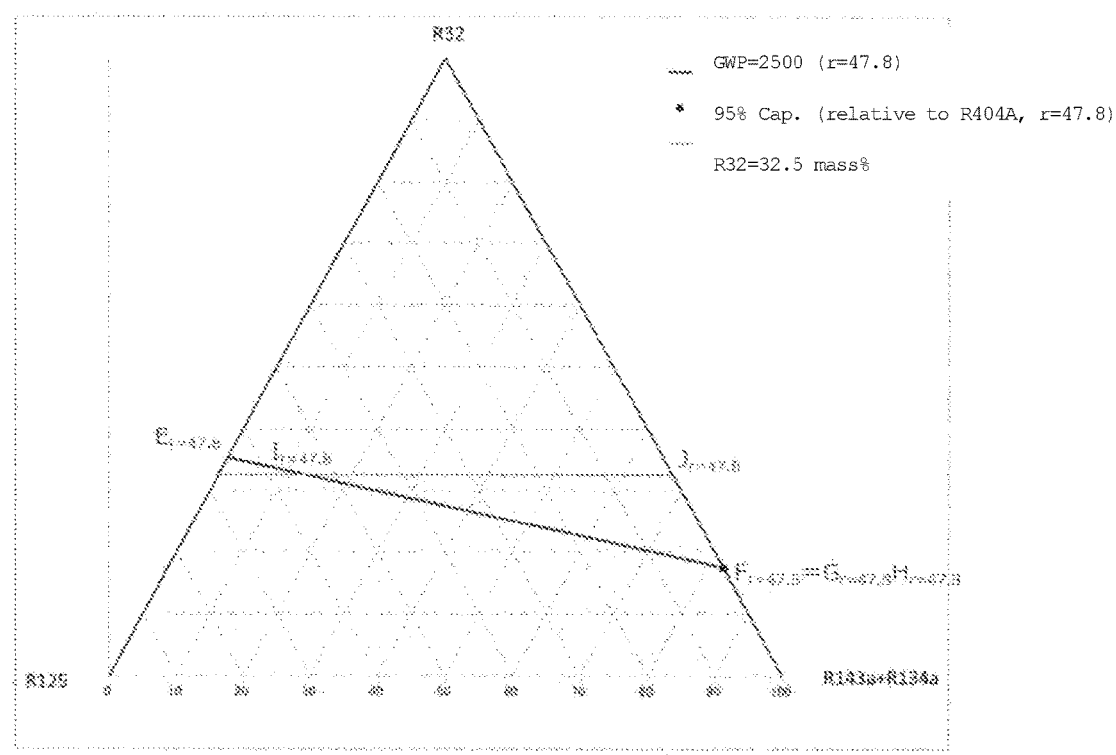
FIG. 15 is a diagram illustrating the compositional ratio of a refrigerant contained in the composition according to the present disclosure (the compositional ratio falls within a triangular region that has points $I_{r=47.8}$, $G_{r=47.8}$ (=$F_{r=47.8}$=$H_{r=47.8}$), and $J_{r=47.8}$ as vertices).

In the ternary composition diagram in which the total concentration of R32, R125, and (R143a+R134a) is 100 mass %, a set of points at which the GWP is 2500 is indicated by a straight line that connects point $E_{0 \leq r \leq 47.8}$ and point $F_{0 \leq r \leq 47.8}$, which is indicated as a function of r where r=100×[R143a/(R143a+R134a)]. For example, in the ternary composition diagrams of FIGS. 10 to 15, the GWP is 2500 or less in the region from the straight line toward the vertex of R32.

In the ternary composition diagram in which the total concentration of R32, R125, and (R143a+R134a) is 100 mass %, a set of points at which the refrigerating capacity relative to R404A is 95% is approximated to a straight line that connects point $G_{0 \leq r \leq 47.8}$ and point $H_{0 \leq r \leq 47.8}$, which is indicated as a function of r where r=100×[R143a/(R143a+R134a)]. For example, in the ternary composition diagrams of FIGS. 10 to 15, the refrigerating capacity relative to R404A is 95% or more in the region from the approximate straight line toward the vertex of R32.

1.3 Application

The refrigerant according to the present disclosure has the following performance: a refrigerating capacity equivalent to that of widely used R404A, and a low GWP (2500 or less). Thus, the composition containing the refrigerant according to the present disclosure has a wide range of applications as a working fluid in existing refrigerants, such as in (1) a refrigeration method including operating a refrigeration cycle, and (2) a method for operating a refrigerating machine that operates a refrigeration cycle. The "refrigeration cycle" refers to energy conversion by circulating the composition according to the present disclosure in the form of refrigerant as is, or in the form of a refrigerant composition or a refrigerant oil-containing working fluid described later, through a compressor.

Thus, the present disclosure includes a disclosure of the use of the composition according to the present disclosure in a refrigeration method, a disclosure of the use of the composition according to the present disclosure in a method for operating a refrigerating machine, and a disclosure of a refrigerating machine including the composition according to the present disclosure. Although not limited thereto, an applicable refrigerating machine is, for example, preferably at least one member selected from the group consisting of refrigerators, freezers, water coolers, ice makers, refrigerating showcases, freezing showcases, freezing and refrigerating units, refrigerating machines for freezing and refrigerating warehouses, turbo refrigerating machines, and screw refrigerating machines.

2. Refrigerant Composition

The refrigerant composition according to the present disclosure contains at least the refrigerant according to the present disclosure, and can be used in the same application as with the refrigerant according to the present disclosure. The refrigerant composition according to the present disclosure can be used in obtaining a working fluid for a refrigerating machine by further mixing the refrigerant composition with at least a refrigerant oil.

The refrigerant composition according to the present disclosure further contains at least one component other than the refrigerant according to the present disclosure, in addition to the refrigerant. The refrigerant composition of the present disclosure may optionally contain at least one of such other components as described below. As described above, the refrigerant composition according to the present disclosure for use as a working fluid in a refrigerating machine is typically used as a mixture with at least a refrigerant oil. Preferably, the refrigerant composition according to the present disclosure is substantially free of a refrigerant oil. Specifically, the refrigerant composition according to the present disclosure has a refrigerant oil content of preferably 0 to 1 mass %, and more preferably 0 to 0.1 mass %, based on the entire refrigerant composition.

2.1 Water

The refrigerant composition according to the present disclosure may contain a small amount of water. The water content in the refrigerant composition is preferably 0.1 parts by mass or less, per 100 parts by mass of the refrigerant. A small amount of water contained in the refrigerant composition stabilizes double bonds in the molecules of unsaturated fluorocarbon-based compounds that can be present in the refrigerant; and makes it less likely that the unsaturated fluorocarbon-based compounds will be oxidized, thus increasing the stability of the refrigerant composition.

2.2 Tracer

A tracer is added to the refrigerant composition according to the present disclosure in a detectable concentration so that when the refrigerant composition has been diluted, contaminated, or undergone some other changes, the tracer can trace the changes.

The refrigerant composition according to the present disclosure may contain a single tracer, or two or more tracers.

The tracer is not limited, and can be suitably selected from typically used tracers.

Examples of tracers include hydrofluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon or a fluoroether.

2.3. Ultraviolet Fluorescent Dye

The refrigerant composition according to the present disclosure may contain a single ultraviolet fluorescent dye, or two or more ultraviolet fluorescent dyes.

The ultraviolet fluorescent dye is not limited, and can be suitably selected from typically used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may contain a single stabilizer, or two or more stabilizers.

The stabilizer is not limited, and can be suitably selected from typically used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine, and diphenyl amine.

Examples of stabilizers also include butylhydroxyxylene, and benzotriazole.

The content of the stabilizer is not limited. Typically, the content of the stabilizer is preferably 0.01 to 5 parts by mass, and more preferably 0.05 to 2 parts by mass, per 100 parts by mass of the refrigerant.

The method for evaluating the stability of the refrigerant composition is not limited, and the refrigerant composition can be evaluated by a commonly used technique. An example of such techniques is a method evaluating stability with the amount of free fluorine ions as an index in accordance with ASHRAE Standard 97-2007. Additionally, a method evaluating stability with the total acid number as an index is also usable. This method can be performed, for example, in accordance with ASTM D 974-06.

2.5. Polymerization Inhibitor

The refrigerant composition according to the present disclosure may contain a single polymerization inhibitor, or two or more polymerization inhibitors.

The polymerization inhibitor is not limited, and can be suitably selected from typically used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Typically, the content of the polymerization inhibitor is preferably 0.01 to 5 parts by mass, and more preferably 0.05 to 2 parts by mass, per 100 parts by mass of the refrigerant.

2.6 Other Components that May be Contained in the Refrigerant Composition

The refrigerant composition according to the present disclosure may contain the following components.

For example, the refrigerant composition may contain a fluorinated hydrocarbon different from the refrigerant described above. The fluorinated hydrocarbon as another component is not limited, and such fluorinated hydrocarbons include at least one fluorinated hydrocarbon selected from the group consisting of HCFC-1122, HCFC-124, CFC-1113, and 3,3,3-trifluoropropyne.

The refrigerant composition may also contain, as another component other than those described above, for example, at least one halogenated organic compound represented by formula (1): $C_mH_nX_p$ wherein each X independently represents a fluorine atom, a chlorine atom, or a bromine atom; m is 1 or 2; and $2m+2 \geq n+p$ and $p \geq 1$. The halogenated organic compound is not limited; and is preferably, for example, difluorochloromethane, chloromethane, 2-chloro-1,1,1,2,2-pentafluoroethane, 2-chloro-1,1,1,2-tetrafluoroethane, 2-chloro-1,1-difluoroethylene, or trifluoroethylene.

The refrigerant composition may also contain, as another component other than those described above, for example, at least one organic compound represented by formula (2): $C_mH_nX_p$ wherein each X independently represents an atom other than halogen atoms; m is 1 or 2; and $2m+2 \geq n+p$ and $p \geq 1$. The organic compound is not limited; and is preferably, for example, propane or isobutane.

The content of the fluorinated hydrocarbon, the halogenated organic compound represented by formula (1), and the organic compound represented by formula (2) is not limited. However, the total amount of these compounds is preferably 0.5 mass % or less, more preferably 0.3 mass % or less, and particularly preferably 0.1 mass % or less, based on the total amount of the refrigerant composition.

3. Refrigerant Oil-Containing Working Fluid

The refrigerant oil-containing working fluid according to the present disclosure contains at least the refrigerant or refrigerant composition for use in the present disclosure, and a refrigerant oil. Specifically, the refrigerant oil-containing working fluid for use in the present disclosure is obtained by mixing a refrigerant oil for use in a compressor of a refrigerating machine with the refrigerant or refrigerant composition. The refrigerant oil-containing working fluid typically contains 1 to 50 mass % of a refrigerant oil.

3.1 Refrigerant Oil

The composition according to the present disclosure may contain only one refrigerant oil, or two or more refrigerant oils.

The refrigerant oil is not limited, and can be suitably selected from typically used refrigerant oils. When doing so, a refrigerant oil that is superior, for example, in action of improving miscibility with the mixture and the stability of the mixture can be suitably selected, as necessary.

The base oil of the refrigerant oil is preferably, for example, at least one member selected from the group consisting of polyalkylene glycols (PAG), polyol esters (POE), and polyvinyl ethers (PVE).

The refrigerant oil may further contain an additive in addition to the base oil. The additive may be at least one member selected from the group consisting of antioxidants, extreme-pressure additives, acid scavengers, oxygen scavengers, copper deactivators, rust inhibitors, oil agents, and antifoaming agents.

The refrigerant oil preferably has a kinematic viscosity of 5 to 400 cSt at 40° C., from the standpoint of lubrication.

The refrigerant oil-containing working fluid according to the present disclosure may further optionally contain at least one additive. Examples of additives include the following compatibilizing agent.

3.2 Compatibilizing Agent

The refrigerant oil-containing working fluid according to the present disclosure may contain only one compatibilizing agent, or two or more compatibilizing agents.

The compatibilizing agent is not limited, and can be suitably selected from typically used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

EXAMPLES

Below, the present disclosure will be described in detail with reference to Examples and Comparative Examples. However, the present disclosure is not limited to the Examples.

Examples 1-1 to 1-31 and Comparative Examples 1-1 to 1-3, and Examples 2-1 to 2-21 and Comparative Examples 2-1 to 2-8

Refrigerants containing R32, R125, R143a, and R134a of various formulations and the GWP of R404A were evaluated based on the values in the fourth report of the Intergovernmental Panel on Climate Change (IPCC).

Refrigerants containing R32, R125, R143a, and R134a of various formulations and the refrigerating capacity of R404A were determined by performing theoretical calculation of the refrigeration cycle for each refrigerant by using the Reference Fluid Thermodynamic and Transport Properties Database (REFPROP 9.0) of the National Institute of Science and Technology (NIST), under the following conditions.

Evaporating Temperature −40° C.
Condensation Temperature 40° C.
Superheating Temperature 20 K
Subcooling Temperature 0 K
Compressor Efficiency 70%

Tables 9 to 17 illustrate the GWP, coefficient of performance (COP), and refrigerating capacity calculated based on these results. The COP and the refrigerating capacity are indicated by the percentage of them relative to R404A.

The COP was calculated using the following formula.

$$COP = (\text{refrigerating capacity or heating capacity}) / \text{power consumption}$$

TABLE 9

| | Item | Unit | Comparative Example 1-1 R404A | Example 1-1 A = C = D | Comparative Example 1-2 B | Example 1-2 A |
|---|---|---|---|---|---|---|
| Formulation | R32 | mass % | | 13.1 | 13.1 | 15.0 |
| | R125 | mass % | | 56.5 | 0.0 | 57.1 |
| | R143a | mass % | | 0.0 | 38.4 | 0.0 |
| | R134a | mass % | | 30.4 | 48.5 | 27.9 |
| | GWP | — | 3922 | 2500 | 2498 | 2500 |
| Performance | Coefficient of performance | (% relative to R404A) | 100 | 105 | 109 | 105 |
| | Refrigerating Capacity | (% relative to R404A) | 100 | 95 | 88 | 99 |

| | Item | Unit | Comparative Example 1-3 B | Example 1-3 C | Example 4 D |
|---|---|---|---|---|---|
| Formulation | R32 | mass % | 15.0 | 15.0 | 15.0 |
| | R125 | mass % | 0.0 | 51.5 | 33.5 |
| | R143a | mass % | 38.9 | 0.0 | 16.1 |
| | R134a | mass % | 46.1 | 33.5 | 35.4 |
| | GWP | — | 2500 | 2383 | 2500 |
| Performance | Coefficient of Performance | (% relative to R404A) | 109 | 106 | 107 |
| | Refrigerating Capacity | (% relative to R404A) | 91 | 95 | 95 |

TABLE 10

| | Item | Unit | Example 1-5 A | Example 1-6 B = D | Example 1-7 C | Example 1-8 A |
|---|---|---|---|---|---|---|
| Formulation | R32 | mass % | 17.4 | 17.4 | 17.4 | 20.0 |
| | R125 | mass % | 58.0 | 0.0 | 45.3 | 59.0 |
| | R143a | mass % | 0.0 | 39.5 | 0.0 | 0.0 |
| | R134a | mass % | 24.6 | 43.1 | 37.3 | 21.0 |
| | GWP | — | 2500 | 2500 | 2236 | 2500 |
| Performance | Coefficient of Performance | (% relative to R404A) | 105 | 109 | 107 | 105 |
| | Refrigerating Capacity | (% relative to R404A) | 103 | 95 | 95 | 109 |

| | Item | Unit | Example 1-9 B | Example 1-10 C | Example 1-11 D |
|---|---|---|---|---|---|
| Formulation | R32 | mass % | 20.0 | 20.0 | 20.0 |
| | R125 | mass % | 0.0 | 38.8 | 0.0 |
| | R143a | mass % | 40.1 | 0.0 | 33.7 |
| | R134a | mass % | 39.9 | 41.2 | 46.3 |
| | GWP | — | 2500 | 2082 | 2303 |

TABLE 10-continued

| Performance | Coefficient of Performance | (% relative to R404A) | 109 | 109 | 110 |
|---|---|---|---|---|---|
| | Refrigerating Capacity | (% relative to R404A) | 99 | 95 | 95 |

TABLE 11

| | Item | Unit | Example 1-12 A | Example 1-13 B | Example 1-14 C | Example 1-15 D |
|---|---|---|---|---|---|---|
| Formulation | R32 | mass % | 22.5 | 22.5 | 22.5 | 22.5 |
| | R125 | mass % | 59.9 | 0.0 | 32.5 | 0.0 |
| | R143a | mass % | 0.0 | 40.8 | 0.0 | 28.2 |
| | R134a | mass % | 17.6 | 36.7 | 45.0 | 49.3 |
| | GWP | — | 2500 | 2500 | 1933 | 2117 |
| Performance | Coefficient of Performance | (% relative to R404A) | 105 | 109 | 110 | 111 |
| | Refrigerating Capacity | (% relative to R404A) | 114 | 103 | 95 | 95 |

| | Item | Unit | Example 1-16 A | Example 1-17 B | Example 1-18 C | Example 1-19 D |
|---|---|---|---|---|---|---|
| Formulation | R32 | mass % | 25.0 | 25.0 | 25.0 | 25.0 |
| | R125 | mass % | 60.8 | 0.0 | 26.4 | 0.0 |
| | R143a | mass % | 0.0 | 41.4 | 0.0 | 22.8 |
| | R134a | mass % | 14.2 | 33.6 | 48.6 | 52.2 |
| | GWP | — | 2500 | 2500 | 1788 | 1934 |
| Performance | Coefficient of Performance | (% relative to R404A) | 105 | 109 | 110 | 111 |
| | Refrigerating Capacity | (% relative to R404A) | 119 | 108 | 95 | 95 |

TABLE 12

| | Item | Unit | Example 1-20 A | Example 1-21 B | Example 1-22 C | Example 1-23 D |
|---|---|---|---|---|---|---|
| Formulation | R32 | mass % | 27.5 | 27.5 | 27.5 | 27.5 |
| | R125 | mass % | 61.7 | 0.0 | 20.4 | 0.0 |
| | R143a | mass % | 0.0 | 42 | 0.0 | 17.6 |
| | R134a | mass % | 10.8 | 30.5 | 52.1 | 54.9 |
| | GWP | — | 2500 | 2500 | 1645 | 1757 |
| | Coefficient of Performance | (% relative to R404A) | 105 | 109 | 111 | 112 |
| | Refrigerating Capacity | (% relative to R404A) | 124 | 112 | 95 | 95 |

| | Item | Unit | Example 1-24 A | Example 1-25 B | Example 1-26 C | Example 1-27 D |
|---|---|---|---|---|---|---|
| Formulation | R32 | mass % | 30.0 | 30.0 | 30.0 | 30.0 |
| | R125 | mass % | 62.6 | 0.0 | 14.5 | 0.0 |
| | R143a | mass % | 0.0 | 42.6 | 0.0 | 12.5 |
| | R134a | mass % | 7.4 | 27.4 | 55.5 | 57.5 |
| | GWP | — | 2500 | 2500 | 1504 | 1584 |
| Performance | Coefficient of Performance | (% relative to R404A) | 105 | 109 | 112 | 112 |
| | Refrigerating Capacity | (% relative to R404A) | 130 | 116 | 95 | 95 |

TABLE 13

| Item | | Unit | Example 1-28 A | Example 1-29 B | Example 1-30 C | Example 1-31 D |
|---|---|---|---|---|---|---|
| Formulation | R32 | mass % | 32.5 | 32.5 | 32.5 | 32.5 |
| | R125 | mass % | 63.5 | 0.0 | 8.6 | 0.0 |
| | R143a | mass % | 0.0 | 43.2 | 0.0 | 7.4 |
| | R134a | mass % | 4 | 24.3 | 58.9 | 60.1 |
| | GWP | — | 2500 | 2500 | 1363 | 1410 |
| Performance | Coefficient of Performance | (% relative to R404A) | 104 | 109 | 113 | 113 |
| | Refrigerating Capacity | (% relative to R404A) | 136 | 120 | 95 | 95 |

TABLE 14

| Item | Unit | Comparative Example 2-1 R404A | Comparative Example 2-2 $E_{r=0}$ | Comparative Example 2-3 $F_{r=0}$ | Example 2-1 $G_{r=0}$ |
|---|---|---|---|---|---|
| R32 | mass % | | 35.4 | 0.0 | 13.1 |
| R125 | mass % | | 64.6 | 51.7 | 56.5 |
| R143a + R134a | mass % | | 0.0 | 48.3 | 30.4 |
| R143a | mass % | | 0.0 | 0.0 | 0.0 |
| R134a | mass % | | 0.0 | 48.3 | 30.4 |
| GWP | | 3922 | 2500 | 2500 | 2500 |
| Comparison in COP | % (relative to R404A) | 100 | 104 | 105 | 105 |
| Comparison in Refrigerating Capacity | % (relative to R404A) | 100 | 142 | 71 | 95 |

| Item | Unit | Comparative Example 2-4 $H_{r=0}$ | Example 2-2 $I_{r=0}$ | Example 2-3 $J_{r=0}$ |
|---|---|---|---|---|
| R32 | mass % | 36.3 | 32.5 | 32.5 |
| R125 | mass % | 0.0 | 63.5 | 9.3 |
| R143a + R134a | mass % | 63.7 | 4.0 | 58.2 |
| R143a | mass % | 0.0 | 0.0 | 0.0 |
| R134a | mass % | 63.7 | 4.0 | 58.2 |
| GWP | | 1156 | 2500 | 1377 |
| Comparison in COP | % (relative to R404A) | 113 | 104 | 112 |
| Comparison in Refrigerating Capacity | % (relative to R404A) | 95 | 136 | 95 |

TABLE 15

| Item | Unit | Comparative Example 2-5 $F_{r=11}$ | Example 2-4 $G_{r=11}$ | Example 2-5 $H_{r=11} = J_{r=11}$ | Example 2-6 $I_{r=11}$ | Comparative Example 2-6 $F_{r=25}$ |
|---|---|---|---|---|---|---|
| R32 | mass % | 0 | 13.6 | 32.5 | 32.5 | 0 |
| R125 | mass % | 42.4 | 50.9 | 0 | 62.8 | 23.6 |
| R143a + R134a | mass % | 57.6 | 35.5 | 67.5 | 4.7 | 76.4 |
| R143a | mass % | 6.3 | 3.9 | 7.4 | 0.5 | 19.1 |
| R134a | mass % | 51.3 | 31.6 | 60.1 | 4.2 | 57.3 |
| GWP | | 2500 | 2500 | 1410 | 2500 | 2500 |
| Comparison in COP | % (relative to R404A) | 106 | 106 | 113 | 104 | 108 |
| Comparison in Refrigerating Capacity | % (relative to R404A) | 70 | 95 | 95 | 135 | 69 |

| Item | Unit | Example 2-7 $G_{r=25}$ | Example 2-8 $H_{r=25}$ | Example 2-9 $I_{r=25}$ | Example 2-10 $J_{r=25}$ |
|---|---|---|---|---|---|
| R32 | mass % | 14.5 | 27.2 | 32.5 | 32.5 |
| R125 | mass % | 40.4 | 0 | 61.2 | 0 |
| R143a + R134a | mass % | 45.1 | 72.8 | 6.3 | 67.5 |

TABLE 15-continued

| | | | | | |
|---|---|---|---|---|---|
| R143a | mass % | 11.3 | 18.2 | 1.6 | 16.9 |
| R134a | mass % | 33.8 | 54.6 | 4.7 | 50.6 |
| GWP | | 2500 | 1778 | 2500 | 1698 |
| Comparison in COP | % (relative to R404A) | 107 | 112 | 105 | 112 |
| Comparison in Refrigerating Capacity | % (relative to R404A) | 95 | 95 | 135 | 101 |

TABLE 16

| Item | Unit | Comparative Example 2-7 $F_{r=35.2}$ | Example 2-11 $G_{r=35.2}$ | Example 2-12 $H_{r=35.2}$ | Example 2-13 $I_{r=35.2}$ | Example 2-14 $J_{r=35.2}$ |
|---|---|---|---|---|---|---|
| R32 | mass % | 0 | 15.4 | 23 | 32.5 | 32.5 |
| R125 | mass % | 0 | 28.1 | 0 | 59.3 | 0 |
| R143a + R134a | mass % | 100 | 56.5 | 77 | 8.2 | 67.5 |
| R143a | mass % | 35.2 | 19.9 | 27.1 | 2.9 | 23.8 |
| R134a | mass % | 64.8 | 36.6 | 49.9 | 5.3 | 43.7 |
| GWP | | 2500 | 2500 | 2080 | 2500 | 1908 |
| Comparison in COP | % (relative to R404A) | 110 | 108 | 111 | 105 | 111 |
| Comparison in Refrigerating Capacity | % (relative to R404A) | 68 | 95 | 95 | 134 | 106 |

TABLE 17

| Item | Unit | Comparative Example 2-8 $F_{r=42.5}$ | Example 2-15 $G_{r=42.5}$ | Example 2-16 $H_{r=42.5}$ | Example 2-17 $I_{r=42.5}$ |
|---|---|---|---|---|---|
| R32 | mass % | 10.8 | 16.4 | 19.8 | 32.5 |
| R125 | mass % | 0 | 14.7 | 0 | 57 |
| R143a + R134a | mass % | 89.2 | 68.9 | 80.2 | 10.5 |
| R143a | mass % | 37.9 | 29.3 | 34.1 | 4.5 |
| R134a | mass % | 51.3 | 39.6 | 46.1 | 6 |
| GWP | | 2500 | 2500 | 2317 | 2500 |
| Comparison in COP | % (relative to R404A) | 110 | 108 | 110 | 105 |
| Comparison in Refrigerating Capacity | % (relative to R404A) | 85 | 95 | 95 | 134 |

| Item | Unit | Example 2-18 $J_{r=42.5}$ | Example 2-19 $F_{r=47.8}$ = $H_{r=47.8}$ = $G_{r=47.8}$ | Example 2-20 $I_{r=47.8}$ | Example 2-21 $J_{r=47.8}$ |
|---|---|---|---|---|---|
| R32 | mass % | 32.5 | 17.4 | 32.5 | 32.5 |
| R125 | mass % | 0 | 0 | 54.2 | 0 |
| R143a + R134a | mass % | 67.5 | 82.6 | 13.3 | 67.5 |
| R143a | mass % | 28.7 | 39.5 | 6.4 | 32.3 |
| R134a | mass % | 38.8 | 43.1 | 6.9 | 35.2 |
| GWP | | 2057 | 2500 | 2500 | 2167 |
| Comparison in COP | % (relative to R404A) | 110 | 109 | 105 | 110 |
| Comparison in Refrigerating Capacity | % (relative to R404A) | 109 | 95 | 133 | 112 |

DESCRIPTION OF REFERENCE NUMERALS

A: a compositional ratio when the GWP is 2500, and the concentration of R143a (mass %) is 0.0 mass %.

B: a compositional ratio when the GWP is 2500, and the concentration of R125 (mass %) is 0.0 mass %.

C: a compositional ratio when the refrigerating capacity relative to R404A is 95%, and the concentration of R143a (mass %) is 0.0 mass %.

D: a compositional ratio when the refrigerating capacity relative to R404A is 95%, and the GWP is 2500 or the concentration of R143a (mass %) is 0.0 mass %.

$E_{0 \leq r \leq 47.8}$: a compositional ratio when the GWP is 2500, and the concentration of (R143a+R134a)(mass %) is 0.0 mass %.

$F_{0 \leq r \leq 47.8}$: a compositional ratio when the GWP is 2500, and the concentration of R32 (mass %) is 0.0 mass %.

$G_{0 \leq r \leq 47.8}$: a compositional ratio when the GWP is 2500, and the refrigerating capacity relative to R404A is 95%.

$H_{0 \leq r \leq 47.8}$: a compositional ratio when the refrigerating capacity relative to R404A is 95%, and the concentration of R125 (mass %) is 0.0 mass %.

$I_{0 \leq r \leq 47.8}$: a compositional ratio when the GWP is 2500, and the concentration of R32 (mass %) is 32.5 mass %.

$J_{0 \leq r \leq 47.8}$: a compositional ratio when the refrigerating capacity relative to R404A is 95%, and the concentration of R32 (mass %) is 32.5 mass %.

The invention claimed is:

1. A composition comprising a refrigerant that contains R32, R125, R143a, and R134a, wherein the total concentration of R32, R125, R143a, and R134a is 99.5 mass % or more based on the entire refrigerant,
the composition comprising one member selected from the group consisting of refrigerant 1, and refrigerant 4,
wherein
the total concentration of R32, R125, R143a, and R134a is 100 mass %,
the concentration of R32 is x mass %, and
in a ternary composition diagram in which the total concentration of R125, R143a, and R134a is (100-x) mass %,
refrigerant 1 has a compositional ratio as follows
(1) -1 17.4 mass % ≥ x ≥ 13.1 mass %,
(1) -2 the concentration of R125, R143a, and 134a (the concentration of R125 (mass %)/the concentration of R143a (mass %)/the concentration of 134a (mass %)) falls on a point or within a triangular region that has the following points as vertices
point A (0.35x+51.892/0.0/100−R32−R143a−R125),
point D ($-0.4309x^2+0.0043x+130.4/0.2968x^2+0.1331x-52.681$/100−R32−R143a−R125), and
point C (−2.2307x+90.59/0.0/100−R32−R125−R143a); and
refrigerant 4 has a compositional ratio as follows
(4) -1 32.5 mass % ≥ x > 27.5 mass %,
(4) -2 the concentration of R125, R143a, and 134a (the concentration of R125 (mass %)/the concentration of R143a (mass %)/the concentration of 134a (mass %)) falls within a quadrangular region that has the following points as vertices
point A (0.36x+51.8/0.0/100−R32−R125−R143a),
point B (0.0/0.24x+35.4/100−R32−R125−R143a),
point D (0.0/−2.04x+73.7/100−R32−R125−R143a), and
point C (−2.36x+85.3/0.0/100−R32−R125−R143a).

2. A composition comprising a refrigerant that contains R32, R125, R143a, and R134a, wherein the total concentration of R32, R125, R143a, and R134a is 99.5 mass % or more based on the entire refrigerant,
the composition comprising one member selected from the group consisting of refrigerant A, and refrigerant C,
wherein
the total concentration of R32, R125, and (R143a+R134a) is 100 mass %,
the ratio of the concentration of R143a to the concentration of (R143a+R134a) is r=100×[R143a/(R143a+R134a)], and
in a ternary composition diagram in which the total concentration of R32, R125, and (R143a+R134a) is 100 mass %,
refrigerant A has a compositional ratio as follows
(1) -1 11 ≥ r ≥ 0,
(1) -2 the concentration of R32, R125, and (R143a+134a) (the concentration of R32 (mass %)/the concentration of R125 (mass %)/the concentration of (R143a+134a)(mass %)) falls within a triangular region that has the following points as vertices
point $I_{0 \leq r \leq 11}$ (32.5/−0.0636r+63.5/100−R32−R125),
point $G_{0 \leq r \leq 11}$ (0.0455r+13.1/−0.5091r+56.5/100−R32−R125), and
point $J_{0 \leq r \leq 11}$ (32.5/−0.8455r+9.3/100−R32−R125); and
Refrigerant C has a compositional ratio as follows
(3) -1 47.8 ≥ r > 35.2,
(3) -2 the concentration of R32, R125, and (R143a+134a) (the concentration of R32 (mass %)/the concentration of R125 (mass %)/the concentration of (R143a+134a)(mass %)) falls within a quadrangular region or triangular region that has the following points as vertices
point $I_{35.2 < r \leq 47.8}$ ($32.5/-0.0169r^2+0.9999r+45.073$/100−R32−R125),
point $G_{35.2 < r \leq 47.8}$ ($0.0041r^2-0.1818r+16.716/-0.077r^2+4.163r-23.0$/100−R32−R125),
point $H_{35.2 < r \leq 47.8}$ ($-0.0011r^2-0.3491r+36.712/0.0$/100−R32−R125), and
point $J_{35.2 < r \leq 47.8}$ (32.5/0.0/67.5).

3. The composition according to claim 1, wherein the refrigerant is used as an alternative refrigerant for R404A.

4. The composition according to claim 1, wherein the refrigerant consists of R32, R125, R143a, and R134a.

5. The composition according to claim 1, comprising at least one member selected from the group consisting of water, tracers, ultraviolet fluorescent dyes, stabilizers, and polymerization inhibitors.

6. The composition according to claim 1, comprising a refrigerant oil.

7. The composition according to claim 6, wherein the refrigerant oil contains at least one polymer selected from the group consisting of polyalkylene glycols (PAG), polyol esters (POE), and polyvinyl ethers (PVE).

8. A refrigeration method comprising operating a refrigeration cycle using the composition of claim 1.

9. A method for operating a refrigerating machine that operates a refrigeration cycle using the composition of claim 1.

10. A refrigerating machine using the composition of claim 1.

11. The refrigerating machine according to claim 10, which is at least one member selected from the group consisting of refrigerators, freezers, water coolers, ice makers, refrigerating showcases, freezing showcases, freezing and refrigerating units, refrigerating machines for freezing and refrigerating warehouses, turbo refrigerating machines, and screw refrigerating machines.

* * * * *